United States Patent
Duffy et al.

(10) Patent No.: US 12,446,860 B2
(45) Date of Patent: Oct. 21, 2025

(54) AUTOMATED DETECTION OF LUNG SLIDE TO AID IN DIAGNOSIS OF PNEUMOTHORAX

(71) Applicant: FUJIFILM SONOSITE, INC., Bothell, WA (US)

(72) Inventors: Thomas Michael Duffy, Bothell, WA (US); Davinder S. Dhatt, Bothell, WA (US); Paul Tomotaro Danset, Bothell, WA (US); Adam Benjamin Pely, Bothell, WA (US); Christopher Aleksandr White, Bothell, WA (US); Diku Pranav Mandavia, Bothell, WA (US)

(73) Assignee: FUJIFILM SONOSITE, INC., Bothell, WA (US)

( * ) Notice: Subject to any disclaimer, the term of this patent is extended or adjusted under 35 U.S.C. 154(b) by 0 days.

(21) Appl. No.: 18/140,526

(22) Filed: Apr. 27, 2023

(65) Prior Publication Data
US 2023/0346353 A1    Nov. 2, 2023

Related U.S. Application Data

(60) Provisional application No. 63/337,444, filed on May 2, 2022.

(51) Int. Cl.
*A61B 8/00*    (2006.01)

(52) U.S. Cl.
CPC ............ *A61B 8/5223* (2013.01); *A61B 8/469* (2013.01)

(58) Field of Classification Search
CPC .............................. A61B 8/5223; A61B 8/469
See application file for complete search history.

(56) References Cited

U.S. PATENT DOCUMENTS

| | | | |
|---|---|---|---|
| 11,185,311 B2 | 11/2021 | Raju et al. | |
| 2013/0197370 A1* | 8/2013 | Burlina | G06V 10/50 600/476 |
| 2016/0239959 A1 | 8/2016 | Blackbourne et al. | |
| 2020/0222027 A1 | 7/2020 | Xu et al. | |

(Continued)

FOREIGN PATENT DOCUMENTS

| | | |
|---|---|---|
| CN | 108846840 A | 11/2018 |
| CN | 111528907 A | 8/2020 |

(Continued)

OTHER PUBLICATIONS

International Search Report and Written Opinion received for PCT Patent Application No. PCT/US23/20378, mailed on Aug. 21, 2023, 10 pages.

(Continued)

*Primary Examiner* — Jason M Ip
(74) *Attorney, Agent, or Firm* — Womble Bond Dickinson (US) LLP

(57) ABSTRACT

Methods and apparatuses for performing automated detection of lung slide using a computing device (e.g., an ultrasound system, etc.) are disclosed. In some embodiments, the techniques determine lung sliding using one or more neural networks. In some embodiments, the neural networks are part of a process that determines probabilities of the lung sliding at one or more M-lines. In some embodiments, the techniques display one or more probabilities of lung sliding in a B-mode ultrasound image.

20 Claims, 16 Drawing Sheets

(56) References Cited

U.S. PATENT DOCUMENTS

| | | |
|---|---|---|
| 2020/0367860 A1 | 11/2020 | Rouet et al. |
| 2021/0298715 A1 | 9/2021 | Xu et al. |
| 2022/0160334 A1* | 5/2022 | Venkataramani ...... A61B 8/085 |

FOREIGN PATENT DOCUMENTS

| | | |
|---|---|---|
| CN | 113855070 A | 12/2021 |
| JP | 2017-532116 A | 11/2017 |
| JP | 2018-527112 A | 9/2018 |
| JP | 2021-503992 A | 2/2021 |
| JP | 2021-524353 A | 9/2021 |
| WO | 2020/037266 A1 | 2/2020 |
| WO | 2021/231206 A1 | 11/2021 |
| WO | 2022/080190 A1 | 4/2022 |

OTHER PUBLICATIONS

International Preliminary Report on Patentability received for PCT Patent Application No. PCT/US2023/020378, mailed on Nov. 14, 2024, 8 pages.

Notice of Reasons for Refusal received for Japanese Patent Application No. 2024-564860, mailed on Aug. 26, 2025, 11 pages (5 pages of English Translation and 6 pages of Original Document).

\* cited by examiner

AUTOMATED DETECTION OF LUNG SLIDE TO AID IN DIAGNOSIS OF PNEUMOTHORAX

PRIORITY

The present application claims the benefit of U.S. Provisional Application No. 63/337,444, filed May 2, 2022, entitled "AUTOMATED DETECTION OF LUNG SLIDE TO AID IN DIAGNOSIS OF PNEUMOTHORAX," and is incorporated by reference in its entirety.

FIELD OF THE INVENTION

The embodiments disclosed herein relate generally to ultrasound imaging; more specifically, the embodiments disclosed herein relate to performing automated detection of lung slide using ultrasound imaging systems including the generation of visualizations (e.g., three-dimensional images) that indicate the presence of lung sliding.

BACKGROUND

Lung ultrasound (US) represents a novel and promising approach for aiding in the diagnosis of Pneumothorax (PTX), with high sensitivity and specificity. More specifically, a determination of lung sliding or non-sliding can aid in the diagnosis of PTX, and the diagnosis of PTX using ultrasound equipment has been done and is determined using lung sliding/non-sliding metrics. The metrics usually involve motion with respect to a pleural line in an ultrasound image. Currently, clinicians evaluate the B-mode video clips for motion above and below the pleural line. Additionally, clinicians use M-mode to look at the motion above and below the pleural line. These techniques have disadvantages in that they must be done by someone skilled in recognizing lung sliding and/or are time consuming and prone to user error. These disadvantages could prevent the use of these techniques in real-time in certain situations, which could impact lifesaving efforts.

SUMMARY

Methods and apparatuses for performing automated detection of lung sliding using a computing device (e.g., an ultrasound system, etc.) are disclosed. In some embodiments, the methods are implemented by a computing device. In some embodiments, a method implemented by a computing device for determining lung sliding includes receiving one or more B-Mode ultrasound images that include a pleural line, generating a feature list from the one or more B-Mode ultrasound images, the feature list indicating at least one feature of the pleural line, and generating, with a neural network implemented at least partially in hardware of the computing device and configured to process the feature list and a B-Mode ultrasound image of the one or more B-Mode ultrasound images, a probability of the lung sliding.

In some other embodiments, a method implemented by a computing device for determining lung sliding includes generating B-Mode ultrasound images, determining an instruction for improving a quality of the B-Mode ultrasound images, and displaying, on a user interface of the computing device, the instruction. The method also includes generating additional B-Mode ultrasound images based on a user adjustment implemented based on the instruction and generating, with a neural network implemented at least partially in hardware of the computing device and based on one or more of the additional B-Mode ultrasound images, a probability of the lung sliding.

In some other embodiments, an ultrasound system for determining lung sliding includes a memory to maintain ultrasound images and a medical worksheet, a neural network implemented at least partially in hardware of the ultrasound system to generate, based on one or more of the ultrasound images, a probability of the lung sliding, and a processor system to populate, automatically and without user intervention in response to the neural network generating the probability, a field of the medical worksheet with an indicator of the lung sliding that is based on the probability.

Other systems, machines and methods for automated detection of lung sliding are also described.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques are disclosed herein to automatically detect lung sliding in ultrasound images generated with ultrasound systems. The detection of lung sliding may be used for aiding in the diagnosis of Pneumothorax (PTX). The automated detection of lung sliding on US can improve diagnostic accuracy and speed, as well as decrease patient management time.

In some embodiments, the ultrasound system automatically detects lung sliding or non-lung sliding in ultrasound images through the use of one or more neural networks. These neural networks use trained models to determine lung sliding to help reduce operator-to-operator variability and implement a consistent algorithm for detection of lung sliding. In some embodiments, the neural networks aid the user by acquiring video clips with acceptable quality to determine the presence of sliding in the lung.

By automatically detecting lung sliding, the ability to diagnose PTX in real-time with portable ultrasound equipment can have lifesaving impacts, as the use of ultrasound equipment would enable the diagnosis of PTX at the point of care without needing to send patients or images to the radiology department. Furthermore, automated detection of lung sliding can improve diagnostic accuracy and speed, as well as decrease patient management time.

Example automated detection algorithms and implementations are discussed in greater detail below.

Figure 1:
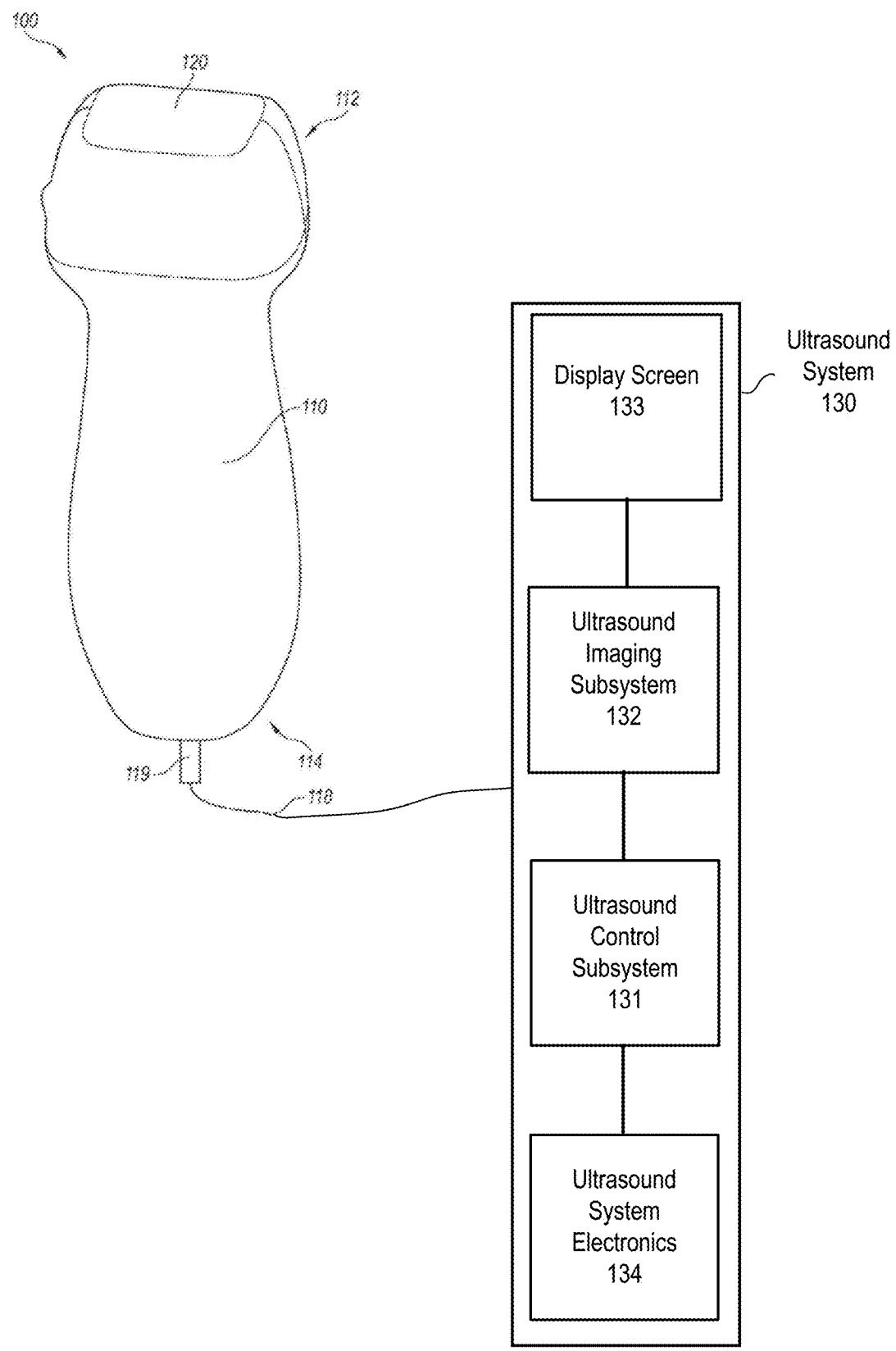
FIG. 1 illustrates some embodiments of an ultrasound machine.

FIG. 1 illustrates some embodiments of an ultrasound machine with the disclosed technology. Referring to FIG. 1, ultrasound transducer probe 100 includes an enclosure 110 extending between a distal end portion 112 and a proximal end portion 114. The ultrasound transducer probe 100 is electrically coupled to an ultrasound imaging system 130 via a cable 118 that is attached to the proximal end of the probe by a strain relief element 119. In some embodiments, ultrasound transducer probe 100 is electrically coupled to an ultrasound imaging system 130 wirelessly.

A transducer assembly 120 having one or more transducer elements is electrically coupled to the system electronics in ultrasound imaging system 130. In operation, transducer assembly 120 transmits ultrasound energy from the one or more transducer elements toward a subject and receives ultrasound echoes from the subject. The ultrasound echoes are converted into electrical signals by the one or more transducer elements and electrically transmitted to the system electronics in ultrasound imaging system 130 to form one or more ultrasound images.

Capturing ultrasound data from a subject using an exemplary transducer assembly (e.g., the transducer assembly 120) generally includes generating ultrasound, transmitting ultrasound into the subject, and receiving ultrasound reflected by the subject. A wide range of frequencies of ultrasound may be used to capture ultrasound data, such as, for example, low frequency ultrasound (e.g., less than 15 MHz) and/or high frequency ultrasound (e.g., greater than or equal to 15 MHz) can be used. Those of ordinary skill in the art can readily determine which frequency range to use based on factors such as, for example, but not limited to, depth of imaging and/or desired resolution.

In some embodiments, ultrasound imaging system 130 includes ultrasound system electronics 134 that comprises one or more processors, integrated circuits, ASICs, FPGAs, and power sources to support the functioning of ultrasound imaging system 130 in a manner well-known in the art. In some embodiments, ultrasound imaging system 130 also includes ultrasound control subsystem 131 having one or more processors. At least one processor, FPGA, or ASIC causes electrical signals to be sent to the transducer(s) of probe 100 to emit sound waves and also receives the electrical pulses from the probe that were created from the returning echoes. One or more processors, FPGAs, or ASICs process the raw data associated with the received electrical pulses and forms an image that is sent to ultrasound imaging subsystem 132, which displays the image on display screen 133. Thus, display screen 133 displays ultrasound images from the ultrasound data processed by the processor of ultrasound control subsystem 131.

In some embodiments, the ultrasound system can also have one or more user input devices (e.g., a keyboard, a cursor control device, microphone, camera, etc.) that inputs data and allows the taking of measurements from the display of the ultrasound display subsystem, a disk storage device (e.g., hard, floppy, thumb drive, compact disks (CD), digital video discs (DVDs)) for storing the acquired images, and a printer that prints the image from the displayed data. These devices also have not been shown in FIG. 1 to avoid obscuring the techniques disclosed herein.

In some embodiments, ultrasound system electronics 134 performs automated detection of lung sliding. The automated detection of whether lung sliding is present or not may aid clinicians in diagnosing or ruling out Pneumothorax and includes benefits such as improved diagnostic accuracy and speed, decreased patient management time, reduced operator-to-operator variability resulting from use of a consistent algorithm for lung sliding.

In some embodiments, the automated detection of lung sliding is performed using an automated artificial intelligence (AI) algorithm that relies on the observation of multiple frames to determine if sliding is present and its location within the body. In some embodiments, the automated detection is performed by sending a series of images to a neural network (e.g., a convolutional neural network (CNN), Swin Transformer, etc.). The series of images may be ultrasound video clips and may be sent as either a collection of stacked images into a single CNN, a series of images into a RNN (Recurrent neural network), or a time-based AI model that is able to provide an indication (e.g., a probability) of whether the images show that lung sliding is present. Given appropriate training data involving fully annotated images of where sliding exists in each image, the model could learn to detect sliding and its location in the images. In some embodiments, as opposed to examining the frames as a whole, the automated detection process examines single lines of the data. The single lines of data may be M-lines from M-mode images. These M-mode images may be generated in a number of ways. For example, the M-mode images may be obtained through M-mode acquisition where a collection of a single line of data is acquired at a fixed rate (for example 100 lines per second) for a period of time (for example one second equals 100 data lines). Additionally or alternatively the M-mode images may be obtained by creating them from B-mode images.

In some embodiments, the automated detection process detects lung sliding from this single M-mode strip (hereinafter "M-strip") by creating one or more M-mode images based on one or more M-lines. That is, an M-strip is a sequence of B-mode frames (e.g., 3 B-mode frames) out of which M-mode images are extracted at various M-lines. Details of these embodiments are described in more detail below. In some embodiments, the automated detection uses a neural network to examine the single M-strip to determine if there is motion above and below the pleural line, thereby indicating that the lung has not collapsed. In some embodiments, if the acquisition frame rate is high enough, the automated detection process extracts multiple M-strips from a collection of B-mode images (e.g., two-dimensional (2-D) video clips, etc.) and uses a neural network to detect lung sliding from the M-strips. In some embodiments, the automated detection process extracts M-mode lines at an angle to the vertical from each B-mode image in a technique often referred to as anatomical M-mode and uses a neural network to examine these lines to determine if lung sliding is present. In both these cases, the neural network has a model that is trained using appropriate training data involving fully annotated images of where sliding exists in each image and learns to detect sliding and its location in input images.

Figures 2A, 2B:
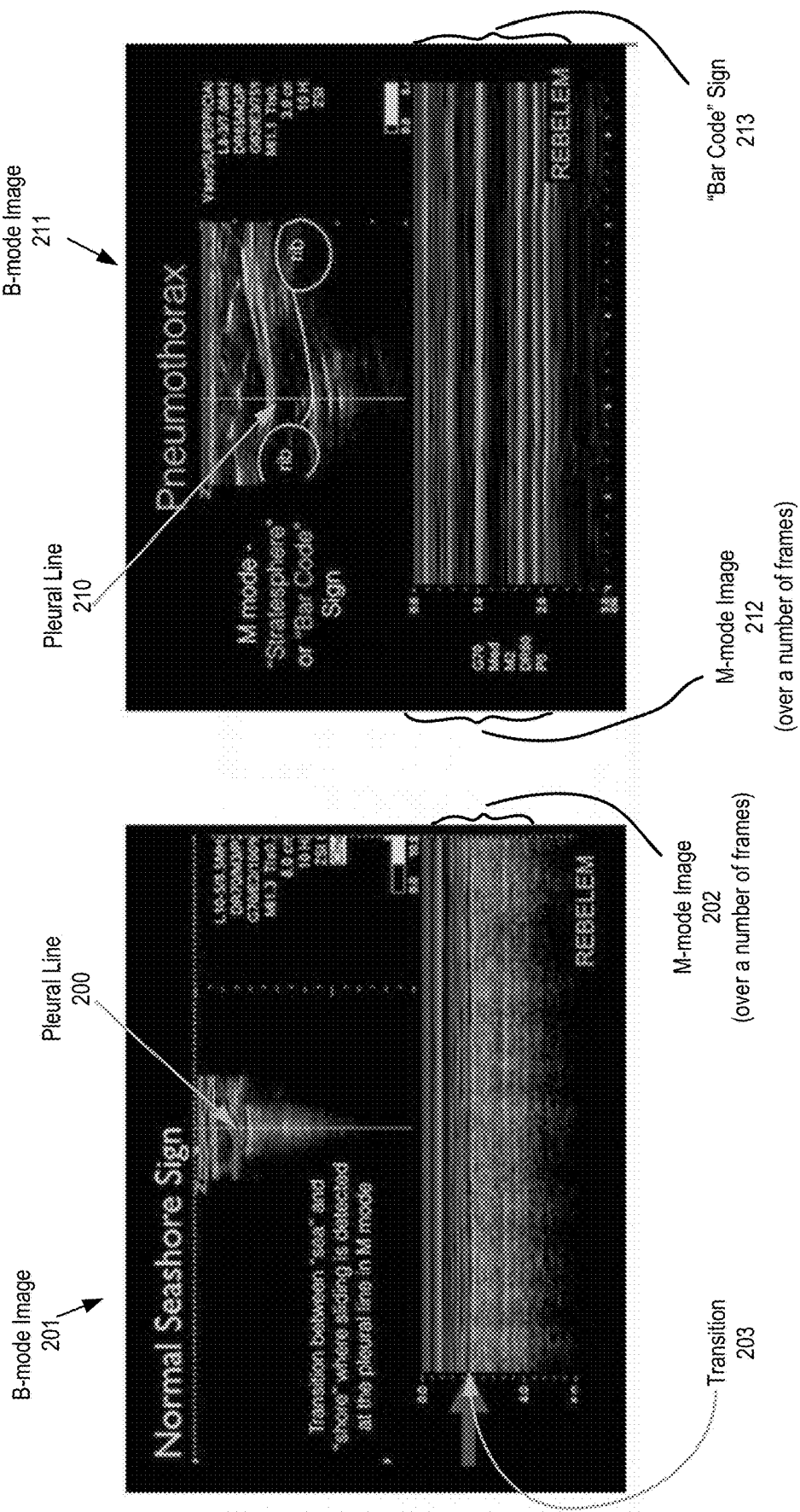
FIGS. 2A and 2B illustrate examples of ultrasound images.

FIGS. 2A and 2B illustrate examples of a B-mode image with a selected horizontal position (illustrated in the top middle portion of the figure) and an M-strip at that location over a number of frames (illustrated below the B-mode image in the figure). In some embodiments, the M-strip is a 3-dimensional array of data (e.g., x and y dimensions of the B-mode image along with the z dimension of time—i.e. frames). In some embodiments, the M-strip is extracted from a sequence of B-mode images and the M-mode image is reconstructed from 2-D ultrasound video clips.

A lung with lung sliding (i.e., a lung which indicates a normal aeration pattern in an inflating and deflating lung) can be shown in an M-mode pattern of uninterrupted horizontal lines superficial to the pleural surface with a granular pattern deep to this level. This is sometimes referred to as a "seashore sign". FIG. 2A illustrates a "seashore sign" in which there is a transition 203 between the "sea" and the "shore" where sliding is detected at pleural line 200 in M-mode image 202 (generated from a number of frames of B-mode images 201) as indicated by the motion above and below pleural line 200 of B-mode image 201. In contrast, FIG. 2B illustrates pneumothorax (PTX) with a pattern sometimes called the "stratosphere" or "bar code" sign 213 in an M-mode image 212 (generated from a number of frames from B-mode images 211), indicating that there is no motion and thus no lung sliding at pleural line 210 in B-mode image 210.

Using a neural network to automatically detect lung sliding by examining ultrasound images has a number of benefits, including, but not limited to, its computational requirements are small and the data is easy to annotate (e.g., is sliding, or is not sliding).

One challenge with an automated detection process that uses M-mode lines is determining what lines to test. In some embodiments, the determination of which lines to test is done by first identifying a region of interest (ROI) in an image where M-mode images should be extracted (e.g., suitable to extract M-lines) and tested. For instance, the ROI indicates the set of M-lines from which a selection made be made to extract M-mode images. For example, any of the M-line locations (e.g., X image location) between the left and right portions of the ROI, and once the M-lines are selected, M-mode images are extracted from that M-strip at those M-lines (e.g., X locations). In some embodiments, as discussed above, this ROI spans the pleural line in a rib space of the lung. In one example, more than one M-line from the region is tested to improve the accuracy of the sliding determination. It is also likely that different regions of the lung will have different levels of sliding depending on the severity of the PTX observed.

Example Automatic Detection Embodiments

In some embodiments, the automated detection process has a number of processes including determining image quality for lung sliding detection, determining an ROI for lung sliding detection, determining an acceptable image quality for M-mode reconstruction regions, and determining lung sliding detection. Each of these operations is described in more detail below.

Determination of Image Quality and Region of Interest (ROI) for Lung Sliding Detection To ensure that the lung sliding detection is evaluated on acceptable images, an AI model referred to herein as a neural network (e.g., a CNN, etc.) can be trained to recognize images that have acceptable quality and an appropriate view for use in automated detection of lung sliding. In some embodiments, the determination of acceptable quality is based on one or more factors, such as but not limited to resolution, gain, brightness, clarity, centeredness, depth, recognition of the pleural line, and recognition of a rib and/or rib shadow.

In some embodiments, the neural network recognizes appropriate views by recognizing the images that have such expected features as a pleural line and ribs in the image. For example, in some embodiments, the neural network recognizes a clear pleural line in the upper middle region of an image and seeing at least one rib shadow on one of the sides of the image. In one embodiment, the neural network is trained to recognize the locations of the pleural line via different methods. These methods can include, but are not limited to, the use of two points at the extents of the pleural line, left and right extents and center depth, a segmentation map, and a heat map.

Figure 3B:
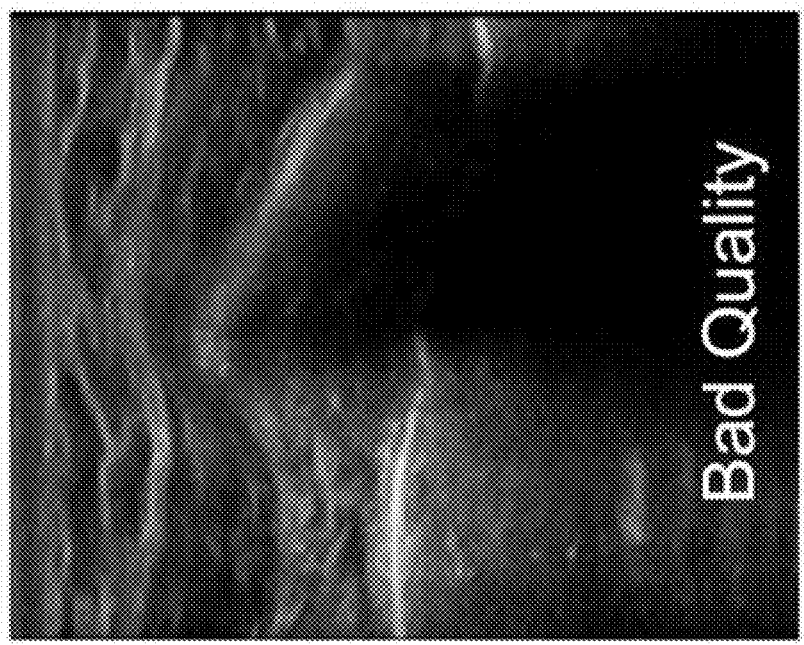
FIG. 3B illustrates an example of a bad quality image.
Figure 3A:
FIG. 3A illustrates an example of a good quality image.

In some embodiments, data output from the neural network, combined with heuristics, can be used to determine images that are acceptable, or good quality, or determine that images are not acceptable, or bad quality. FIG. 3A illustrates an example of a good quality image. The neural network may determine an image is not acceptable, as having bad quality, because of one or more of its attributes such as, for example, images that are too dark, too bright, too fuzzy, too deep, too shallow, not centered, in addition to not recognizing expected features such as the pleural line and ribs; and the neural network may determine that an image is acceptable, e.g., as having good quality, when it does not have any of these attributes that made the image unacceptable. FIG. 3A illustrates an example of a good-quality image. FIG. 3B illustrates an example of a poor-quality image. In some embodiments, the neural network outputs the good and bad quality indications as good/bad probability for a number of attributes.

Figure 4:
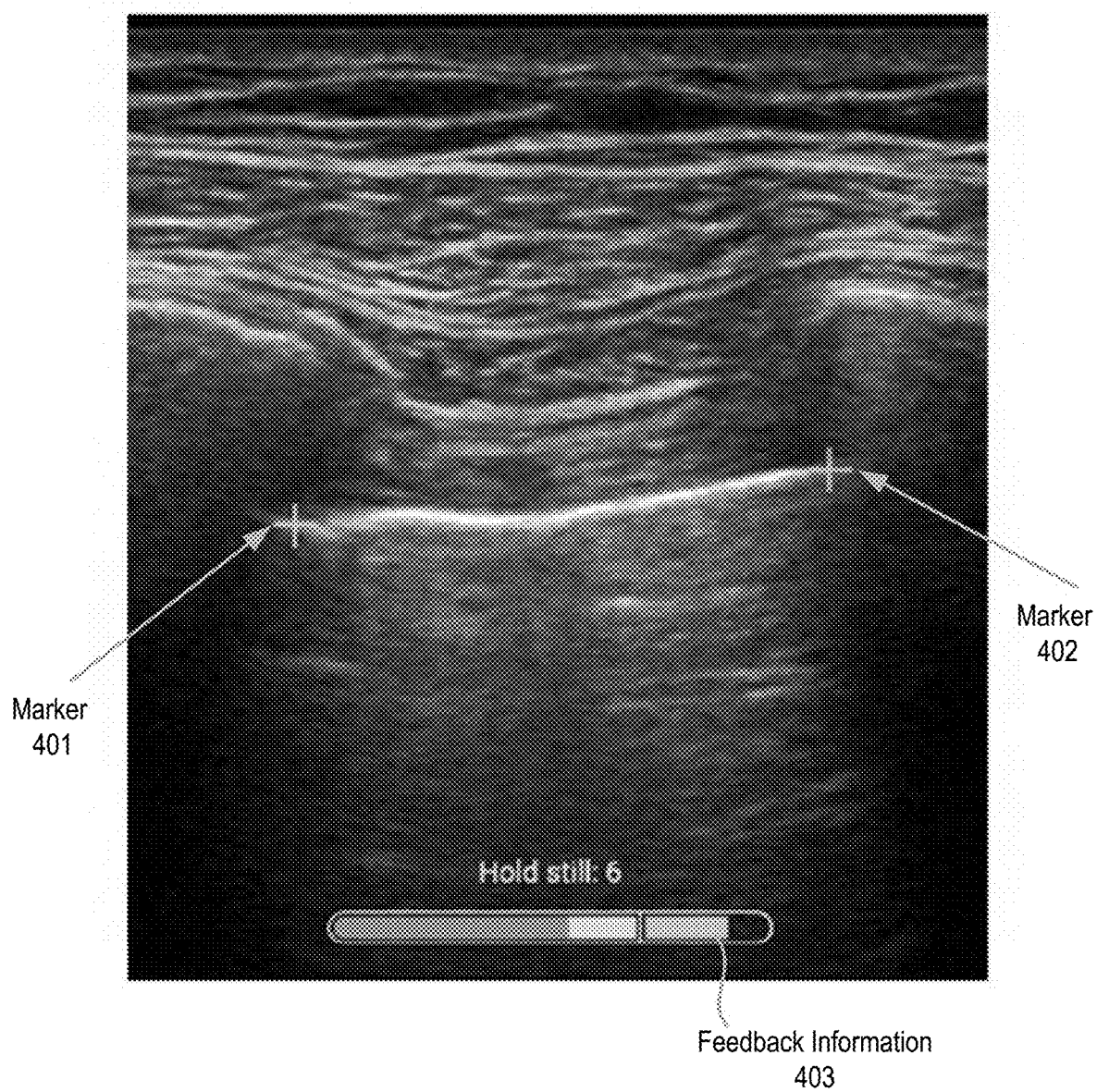
FIG. 4 illustrates an example of a pleural line.

In addition to computing a good/bad probability for a number of attributes, the neural network can also detect the location of the two points (e.g., x,y locations or coordinates) that mark the left and right edges, or end points, of the pleural line in the image. FIG. 4 illustrates an example of a pleural line. Referring to FIG. 4, markers 401 and 402 indicate the end points of the pleural line.

In some embodiments, to determine the overall quality of a B-mode ultrasound image, the good/bad probability generated by the neural network is used in combination with heuristic rules that use the x/y locations of the pleural line. In some embodiments, the x locations are used to determine if the pleural line spans a prescribed distance within the image. In some embodiments, the prescribed distance is based on the percentage of the image centered on the center of the image. For example, the line segment made by connecting the ROI points can cross the center of the image. If the pleural line does not span the prescribed distance, then the image is considered bad. The y locations of the pleural line can be used to determine if the image is too deep or too shallow. The location information can be used to determine the region of interest (ROI) over which a metric for lung sliding is computed. For instance, the x locations of the pleural line from the model can be used to determine a ROI that can be used to select M-line locations for reconstructed M-mode images.

In some embodiments, the ultrasound system provides guidance or feedback to the user in terms of identifying the aspects of the image that need to be adjusted to produce a better-quality image. For example, the ultrasound system can indicate that the image is required to be centered better, or the pleural line is too short or off screen. Based on this guidance/feedback, the user is able to adjust the position of the probe to adjust the image accordingly. Examples of the guidance also include to adjust depth up or down, adjust gain, move left or right (e.g., to center the window, etc.). Feedback information 403 in FIG. 4 is an example of the feedback or guidance that may be provided on the image or another portion of the display. In this case, feedback information 403 guides the user to hold still the position as opposed to adjusting the position of the probe. The feedback/guidance information may be generated by a neural network. In some embodiments, without user intervention, the ultrasound system automatically turns on and collects data when a neural network indicates the view is good enough, and analyzes sliding (by feeding images to the model).

Determination of Acceptable Quality for M-Mode Reconstruction Regions (M-Strips)

M-mode images can be reconstructed from an M-strip. Before constructing M-mode images from the M-strip, the frames can be examined to determine if the M-strip is acceptable for determining lung sliding. This determination can be based on the reported quality of each frame in the M-strip being of good quality. Additionally or alternatively, in some embodiments, the lung sliding detection process examines ROI points to determine if there is too much motion. Excessive motion can make it difficult to determine if there is lung sliding or not in the reconstructed M-mode. By looking for excessive motion, the M-strip is marked as having good or bad quality. If the M-strip quality is bad, then it would not be used for lung sliding detection. In some embodiments, to detect motion within the M-strip frames, the change in the x,y locations of the pleural line in consecutive B-mode frames can be compared to each other to see if it exceeds a prescribed limit. If the change in the x,y locations of the pleural line exceeds the prescribed limit, then the motion of the M-strip frame is too much for use in determining if lung sliding exists or not. Note that this determination of whether this is too much gross motion in the B-mode images to use it for lung sliding detection can be made by a neural network. For example, the neural network can look at ROIs on multiple frames and if there is misalignment of the points throughout the frames, then the neural network would determine that the M-mode images reconstructed from the B-mode images would not be of good enough quality.

Once an M-strip is designated as good quality, then M-mode images can be reconstructed for any of the M-lines in the B-mode Image within the ROI. In some embodiments, the M-mode images may be reconstructed by taking the vertical image pixels for a given M-line column from each frame (e.g., 25 frames) in the M-strip. This process can be repeated for all selected frames. Combining these vertical columns produces an M-mode image with a pulse repetition frequency (PRF) equal to the frame rate of the video clip.

Figure 5A:
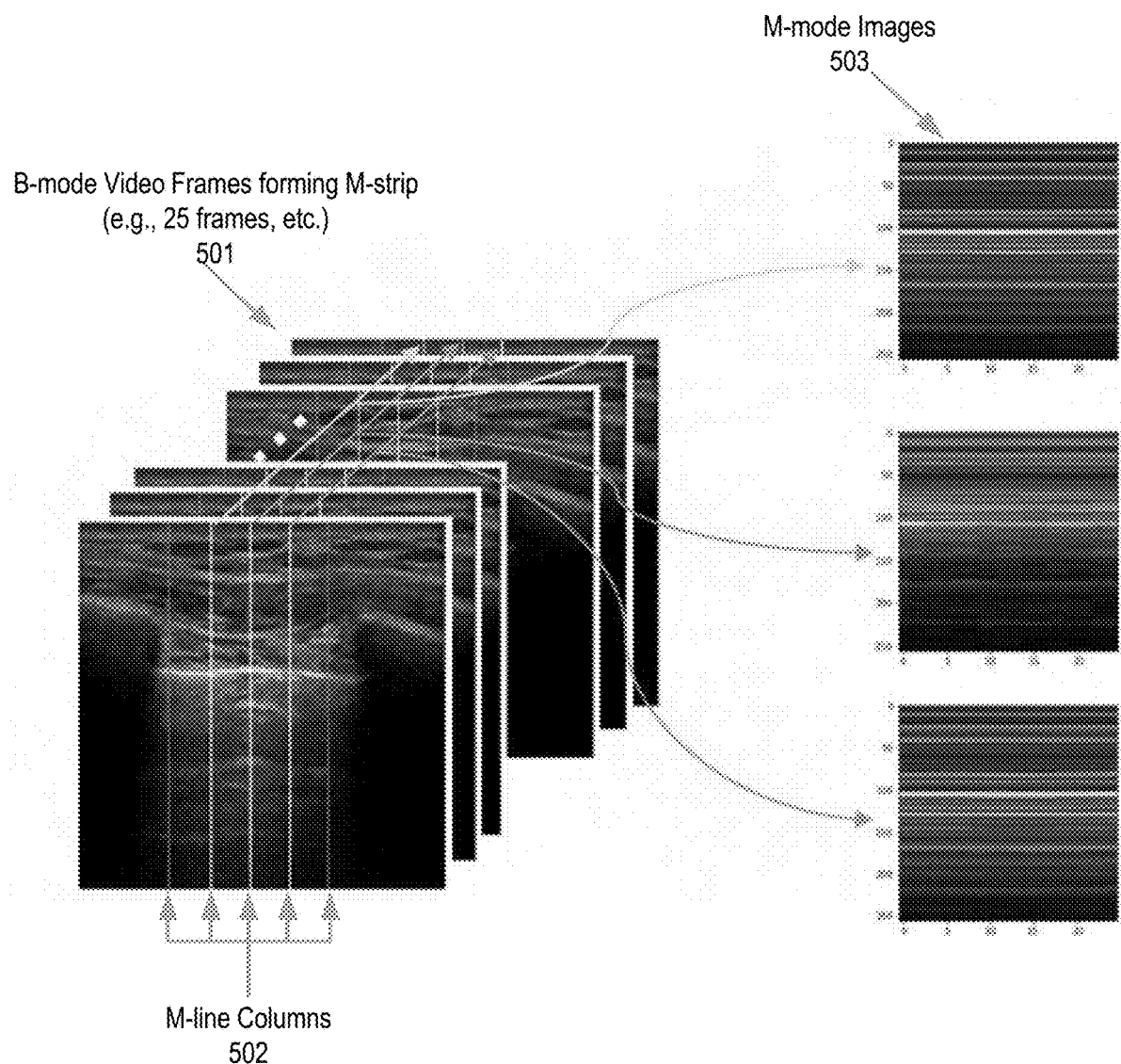
FIG. 5A illustrates M-mode images being constructed from M-line columns of B-mode video frames.

FIG. 5A illustrates M-mode images being constructed from M-line columns of B-mode video frames. Referring to FIG. 5A, B-mode video frames forming M-strip 501 (e.g., 25 frames, etc.) are shown with M-line columns 502 highlighted. The same column of M-line columns 502 in each of the B-mode video frames 501 can be combined to create the M-mode images 503. While FIG. 5A only shows three M-mode images 503, there may be less than or greater than three M-mode images 503 created from M-line columns 502 of B-mode video frames 501. Note that lung sliding can be performed by evaluating multiple M-mode images constructed in this manner. For example, a window that is three or more pixels wide may be examined as a region of interest in the M-mode images 503. This window may be a sliding window that is examined to make a determination on whether lung sliding does or does not exist somewhere in that region.

Alternatively or additionally to constructing M-mode images as described above, the lung sliding detection process can be run and lung sliding can be detected on stored images (e.g., a CINE loop having a sequence of digital images from an ultrasound examination, etc.).

To reduce the motion in M-mode images, the ultrasound system can remove motion from the acquired B-mode frames used to construct the M-mode images. This motion removal can be performed using algorithmic techniques such as, for example, but not limited to, warping or translation using optical flow or motion detection algorithms. Once the motion is removed from the sequence of B-mode images, then the M-mode images can be constructed.

Determination of Lung Sliding

In some embodiments, an additional (e.g., a second) neural network is trained to discriminate between M-mode images that indicate lung sliding and M-mode images that indicate that there is no lung sliding. The reconstructed M-mode images can be fed into this model to determine if there is sliding or not. In some embodiments, this determination is made based on only one M-mode image. In some embodiments, this determination is made based on multiple M-mode images. For example, depending on the available computing resources and response time, the ultrasound system can construct a variable number of M-mode images and pass them through the lung sliding model to determine if there is sliding or not. This detection can be done for a number of M-mode images that are constructed from different M-line locations within the M-strip. This detection can also be done for a number of M-strips (e.g., different sequences of B-mode images that may or may not be contiguous in time). All of the lung sliding detection outputs can be combined in such a way as to get a higher average accuracy than when looking at the lung sliding model detection from a single reconstructed M-mode. In some embodiments, the lung sliding detection outputs are combined using a mean function to achieve high accuracy.

Figure 5B:
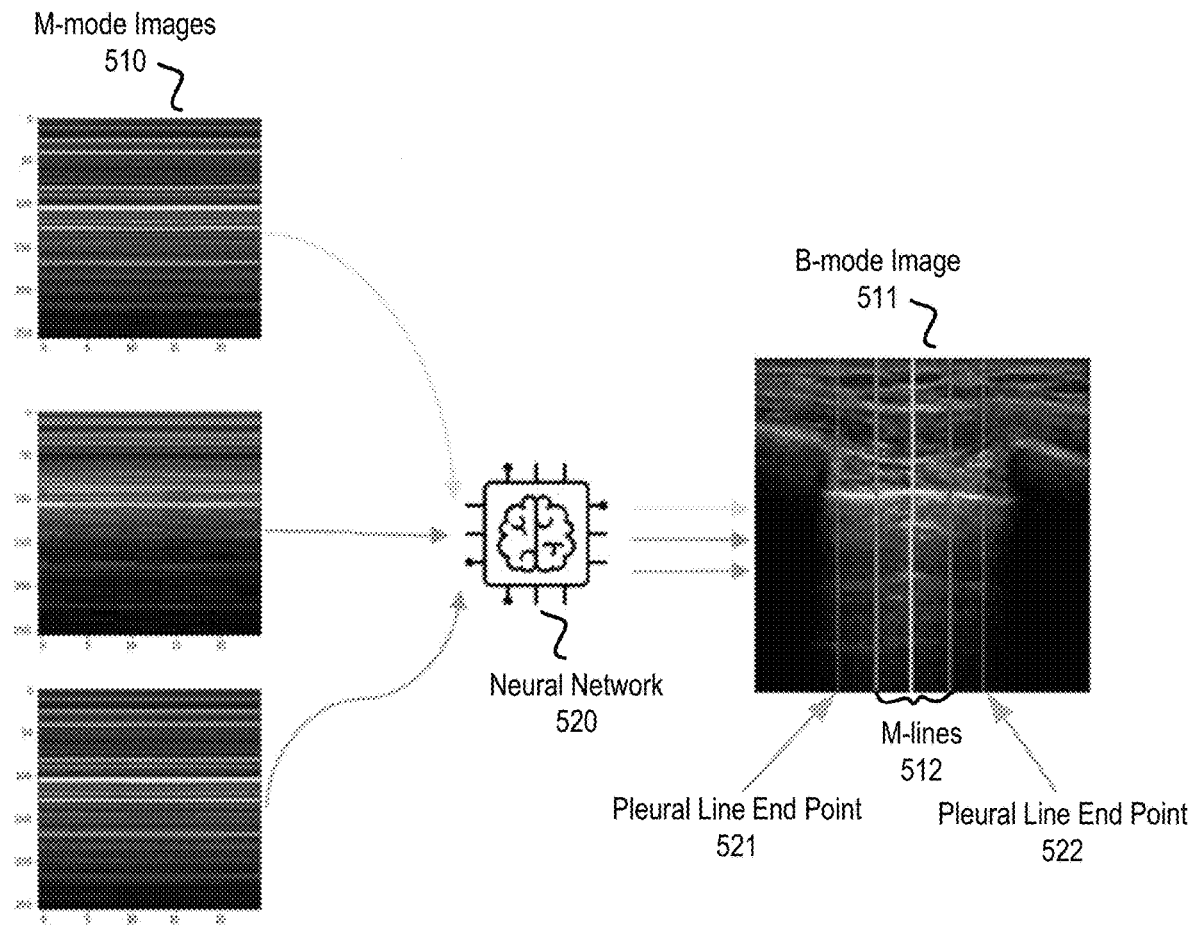
FIG. 5B shows the processing of the M-mode images with a neural network to generate probabilities of lung sliding at three M-lines.

FIG. 5B shows the processing of the M-mode images with a neural network to generate probabilities of lung sliding at three M-lines. Referring to FIG. 5B, M-mode images 510 are input to neural network 520 to produce B-mode image 511 with M-lines 512 between pleural line end points 521 and 522. The M-mode images 510 are examples of M-mode images generated from an M-strip of B-mode images, such as M-mode images 503 in FIG. 5A, while M-lines 512 are examples of M-lines taken from a M-stripe such as M-line columns 502 of M-strip 501. While FIG. 5B shows three M-mode images 510 being input to neural network 520, in alternative embodiments, more or less than three M-mode images may be input into neural network to detect lung sliding.

In some embodiments, M-lines 512 are displayed in the B-mode image 511 with an indication indicating the probability of lung sliding or not. For example, one of M-lines 512 can be a particular gradient color (e.g., green) to indicate sliding, while another one of the M-lines 512 can be displayed on the B-mode image 511 with a gradient color indicating low or no probability of lung sliding (e.g., red). In this case illustrated in FIG. 5B, M-lines 512 that are displayed equal three in number. However, the techniques described here are not limited to displaying only three M-lines. Note that there may be an M-line 512 for every line in the M-mode images 510. In such a case, the lines could indicate the start of lung sliding to a portion where there is no lung sliding. Additionally or alternatively, a user may select which M-lines are to be indicated in the B-mode image 511.

Alternative Refinements of the Lung Sliding Detection
Auto-Refined Lung Sliding Detection of Suspected Cases If non-sliding is detected on sparsely chosen M-lines in the region of interest, then the video clip could be further analyzed by running the lung sliding algorithm on a number of the M-lines (up to the number of M-lines in the ROI). In other words, the analysis can be enhanced by analyzing the video clip further by re-running the lung sliding algorithm on a dense, rather than sparse, set of M-lines. These lung sliding detections could be averaged in the horizontal and/or temporal direction, to filter out noise in the detection result. This result could be displayed graphically, e.g., a heat bar across the pleural line to indicate the probability of lung sliding across the ROI. In some embodiments, to create the heat bar information, one set of M-mode images would be reconstructed starting from a given frame (known as the start frame). Then each of the reconstructed M-mode images can be processed through the lung sliding AI model to determine the probability of lung sliding at that M-line (e.g., the M-line corresponding to the reconstructed M-mode image). These probabilities could then be displayed as a heat bar where, for instance, solid red is 100% non-sliding and solid green is 100% sliding. In some embodiments, all other probability values can be displayed as a gradient between solid red and solid green. Additionally or alternatively, the ultrasound system can display the probabilities as a graph or impulse response with magnitudes between zero and one. To smooth out noise in the probabilities, the probabilities could be filtered in the horizontal direction with a smoothing function.

To further enhance the fidelity of the probabilities used to generate the heat bar, the above process could be repeated for two or more start frames and then the probabilities for each M-line from different start lines could be combined together to get a higher fidelity result. The combining algorithm can use a simple average or it could weight the higher probability answers more than the lower probabilities.

Simultaneous B-Mode and M-Mode Image for Higher Fidelity Detection

Additional imaging states can be created that would enable a higher fidelity determination of lung sliding. Instead of reconstructing very low-resolution M-mode images from the B-mode frames as described above, the ultrasound system can create an imaging state with interspersed additional M-mode pings between the B-mode pings. There could be one M-line chosen and pings could be transmitted and received for the m-line. These pings could be acquired as fast as every other B-mode ping down to as slow as one additional M-mode ping per frame. The trade-off here would be the framerate of the B-mode video versus the resolution of the M-mode image. In some embodiments, the determination of which M-line to fire is fixed, such as the center of the image or a percentage from the center of the image. Alternatively, in some embodiments, the determination of which M-line to fire is dynamically determined, such as, for example, the center of the detected ROI or other locations within the ROI.

In some embodiments, multiple M-lines are selected and acquired interspersed with the B-mode images to allow the simultaneous acquisition of multiple higher resolution M-mode images. As with the acquisition of a single M-mode image interspersed with the B-mode frames, there would be a trade-off between the number of M-lines and the temporal resolution of the M-mode images versus the frame rate of the B-mode images.

High Resolution Mapping Model

In one example, a CNN can be trained to map a lower PRF rate image into a higher PRF rate image by training a super-resolution neural network to construct a higher resolution image. The ultrasound system can generate M-mode images of a first resolution from the M-strip as described above, and run these M-mode images through the super-resolution neural network to create additional M-mode images having a higher resolution than the first resolution. These higher resolution M-mode images could be used as the input for the lung sliding detection model to generate a high-accuracy probability of lung sliding. In some embodiments, the ultrasound system generates an additional M-Mode ultrasound image based on the M-Mode ultrasound image, where the additional M-Mode ultrasound image has a higher resolution than the M-Mode ultrasound image. In some of such embodiments, generating the probability of the lung sliding is based on the additional M-Mode ultrasound image.

An Example of a Lung Sliding Detection System

Figure 6:
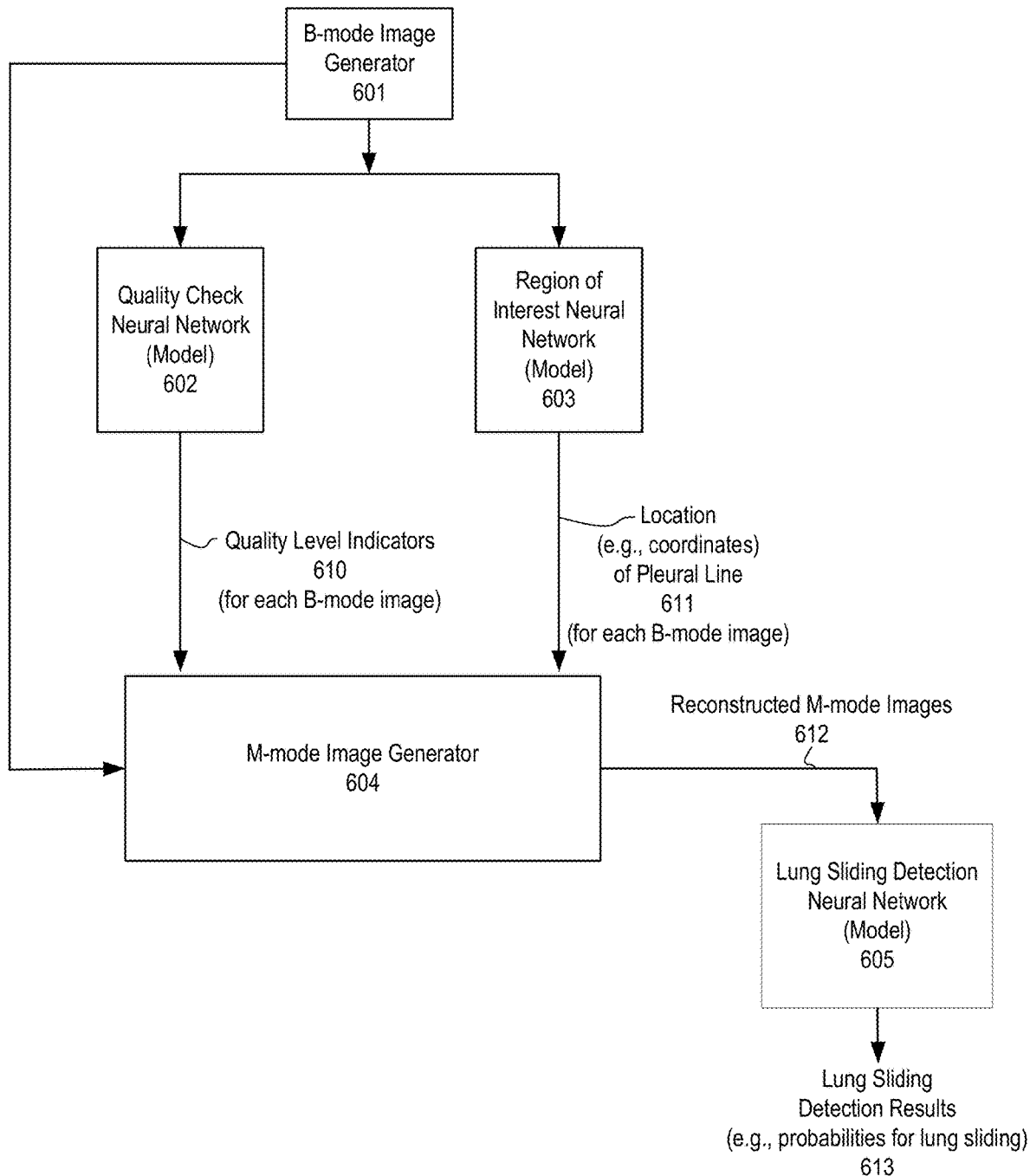
FIG. 6 illustrates some embodiments of a system for performing lung sliding detection processing.

FIG. 6 illustrates some embodiments of system for performing lung sliding detection processing. Referring to FIG. 6, B-mode images from a B-mode image generator 601 are provided to quality check neural network (model) 602 and region of interest neural network (model) 603. In one embodiment, the quality check neural network (model) 602 and the region of interest neural network (model) 603 are separate neural networks. In some embodiments, these neural networks are combined into one neural network. In still other embodiments, these networks share at least one common part and include other parts that are not shared between these networks.

Quality check neural network 602 receives B-mode images from the B-mode image generator 601 and determines whether each of B-mode images is of sufficient quality to be used in the lung sliding detection process. Quality check neural network 602 determines the quality as described above and outputs quality level indications 610 for each of the B-mode images. In some embodiments, the quality is output for display on a display screen (e.g., the display screen of an ultrasound machine, etc.) for the user to guide and improve their image acquisition.

Region of interest neural network 603 receives B-mode images from the B-mode image generator 601 and determines the location of the pleural line 611. ROI neural network 603 outputs location information 611 for each of the B-mode images. In some embodiments, the location information includes sets of coordinates of the end points of the pleural line. In some embodiments, the coordinates are x, y coordinates of the end points of the pleural line in each of the B-mode images.

Quality level indication information 610 and location information 611 are input to M-mode image generator 604 along with B-mode images from the B-mode image generator 601. In response to these inputs, M-mode image generator 604 generates reconstructed M-mode images 612. In some embodiments, M-mode image generator 604 generates reconstructed M-mode images 612 from B-mode images as described above. Additionally or alternatively, the M-mode images can be obtained through a well-known M-mode image acquisition process.

Lung sliding detection neural network (model) 605 receives reconstructed M-mode images 612 and performs lung sliding detection on reconstructed M-mode images 612. In some embodiments, lung sliding detection is performed as described above. As an output, lung sliding detection neural network 605 generates lung sliding detection results 613. In some embodiments, the lung sliding detection results 613 include probabilities associated with each of the images for lung sliding. The lung sliding detection results may be displayed on an ultrasound image, such as, for example, a B-mode image as described above. For example, the ultrasound system can display the lung sliding detection results as part of a heat bar as previously described, and/or as part of a binary icon that distinguishes lung sliding from no lung sliding, such as a thumbs up/thumbs down indicator.

One or more of the neural networks of FIG. 6 can be implemented in a number of different ways. In one embodiment, the neural networks include models that use an EfficientNet architecture, a convolutional neural network (CNN), and/or sequence models including recurrent neural networks (RNN). Note that the detection techniques described herein can be implemented with artificial intelligence (AI) or machine-learning (e.g., adaptive boosting (adaboost), deep-learning, supervised learning models, support vector machine (SVM), Gated Recurrent Unit (GRU), convolutional GRU (ConvGRU), long short-term memory (LSTM), etc., to process frame information in sequence, and the line), and/or another suitable detection method.

Example Flow Diagram of Lung Detection Processes

Figure 7:
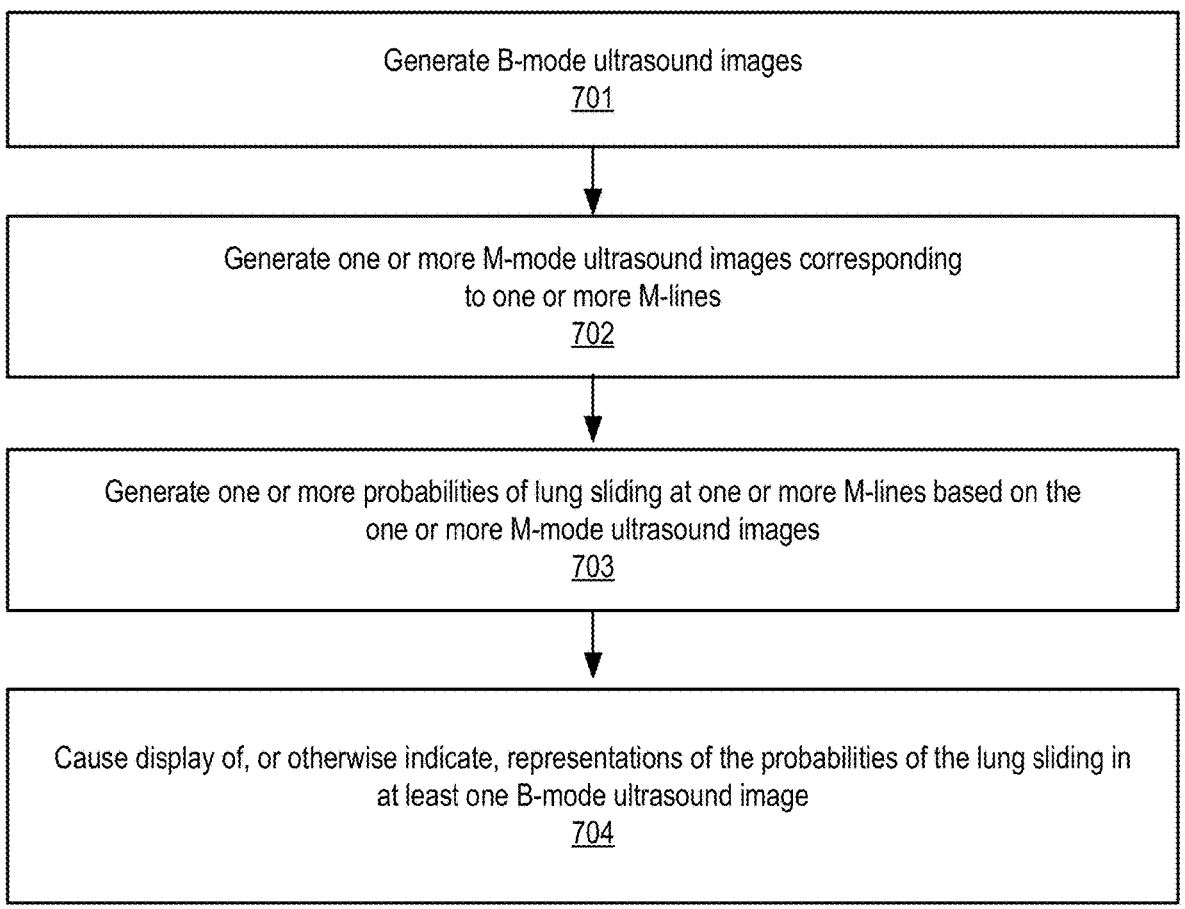
FIG. 7 illustrates a data flow diagram of some embodiments of a lung sliding detection process.

FIG. 7 illustrates a data flow diagram of some embodiments of a lung sliding detection process. The process can be performed by processing logic that can include hardware (e.g., circuitry, dedicated logic, memory, etc.), software (such as is run on a general-purpose computer system or a dedicated machine), firmware (e.g., software programmed into a read-only memory), or combinations thereof. In some embodiments, the process is performed by one or more processors of a computing device such as, for example, but not limited to, an ultrasound machine with an ultrasound imaging subsystem.

Referring to FIG. 7, the process begins by processing logic (e.g., one or more memories) generating B-mode ultrasound images (processing block 701). Processing logic generates one or more M-mode ultrasound images corresponding to one or more M-lines (processing block 702). In some embodiments, the one or more M-mode images are generated based on the pixels of the B-mode images and the one or more M-lines.

Processing logic generates one or more probabilities of lung sliding at one or more M-lines based on the one or more M-mode ultrasound images (processing block 703). In one embodiment, processing logic generates the one or more probabilities of lung sliding at the one or more M-lines using a neural network. In some embodiments, the neural network is implemented at least partially in hardware of a computing device.

After generating the one or more probabilities of lung sliding at one or more M-lines, processing logic causes the display of representations of, or otherwise indicates, the probabilities of the lung sliding in at least one B-mode ultrasound image (processing block 704).

Figure 8:
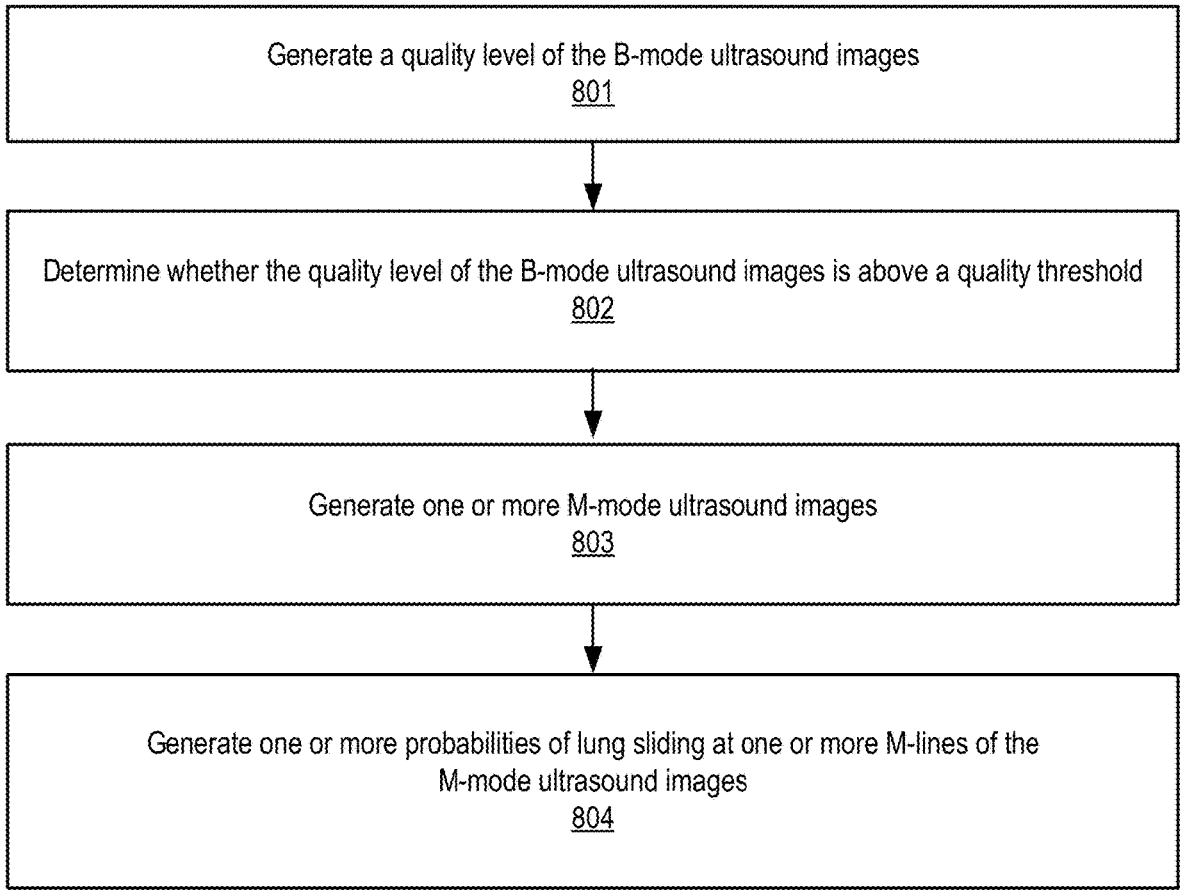
FIG. 8 illustrates a flow diagram of some embodiments of a process for generating M-mode ultrasound images from B-mode ultrasound images.

FIG. 8 illustrates a flow diagram of some embodiments of a process for generating M-mode ultrasound images from B-mode ultrasound images. The process can be performed by processing logic that can include hardware (e.g., circuitry, dedicated logic, memory, etc.), software (such as is run on a general-purpose computer system or a dedicated machine), firmware (e.g., software programmed into a read-only memory), or combinations thereof. In some embodiments, the process is performed by one or more processors of a computing device such as, for example, but not limited to, an ultrasound machine with an ultrasound imaging subsystem.

Referring to FIG. 8, the process begins by processing logic generating a quality level of the B-mode ultrasound images (processing block 801) and determining whether the quality level of the B-mode ultrasound images is above a quality threshold (processing block 802). In one embodiment, processing logic generates the quality level of the B-mode ultrasound images based on attribute quality probabilities and pairs of coordinates. Examples of attribute quality probabilities include probabilities for attribute qualities including a resolution, a gain, a brightness, a clarity, a centeredness, a depth, a recognition of the pleural line, a recognition of a rib, and the like. In some embodiments, processing logic generates the attribute quality probabilities for the B-mode images and pairs of coordinates that indicate edges (e.g., end points) of a pleural line in the B-mode images. In some embodiments, processing logic generates the attribute quality probabilities using a neural network. In some embodiments, the neural network is implemented at least partially of hardware of a computing device.

After determining whether the quality level is above a quality threshold, processing logic generates one or more M-mode ultrasound images (processing block 803). In some embodiments, processing logic generates one or more M-mode ultrasound images in response to the quality level being above the quality threshold. In other words, the M-mode ultrasound images are only generated if the quality of the B-mode images is above the quality threshold.

In some embodiments, processing logic generates additional M-mode ultrasound images by transmitting M-mode ultrasound signals that are interspersed with the B-mode ultrasound signals used to generate the B-mode ultrasound images.

Thereafter, processing logic then generates one or more probabilities of lung sliding at one or more M-lines of the M-mode ultrasound images (processing block 804). In some embodiments, the one or more probabilities are based on the M-mode ultrasound images generated from the B-mode ultrasound images. In some embodiments, the one or more probabilities are also based on the additional M-mode ultrasound images generated by transmitting M-mode ultrasound signals that are interspersed with the B-mode ultrasound signals used to generate the B-mode ultrasound images. In one embodiment, the one or more probabilities based on the additional M-mode ultrasound are generated using a neural network.

Figure 9A:
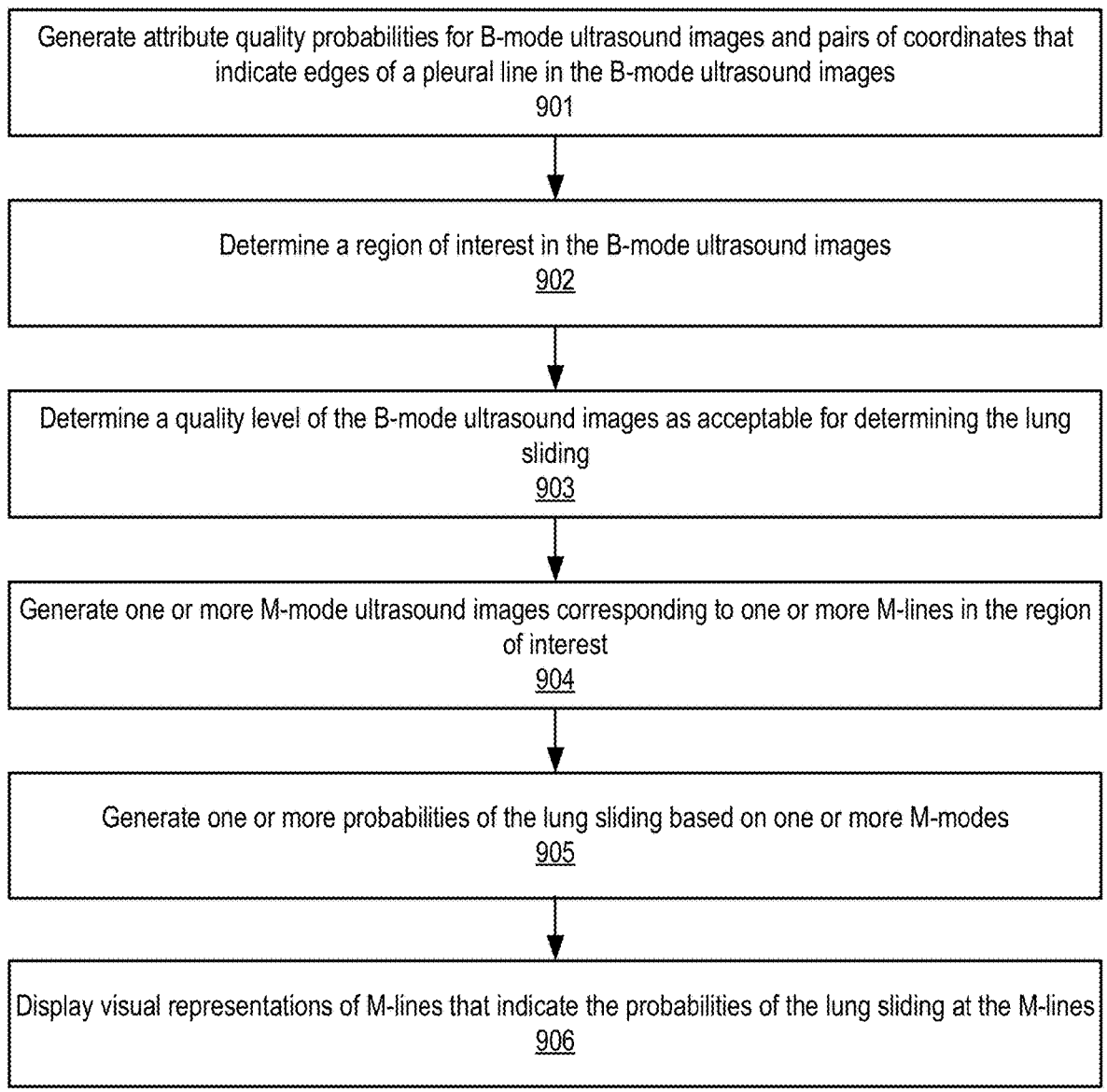
FIG. 9A illustrates a flow diagram of some embodiments of a process for determining lung sliding.

FIG. 9A illustrates a flow diagram of some embodiments of a process for determining lung sliding. The process can be performed by processing logic that can include hardware (e.g., circuitry, dedicated logic, memory, etc.), software (such as is run on a general-purpose computer system or a dedicated machine), firmware (e.g., software programmed into a read-only memory), or combinations thereof. In some embodiments, the process is performed by one or more processors of a computing device such as, for example, but not limited to, an ultrasound machine with an ultrasound imaging subsystem.

Referring to FIG. 9A, the process begins by processing logic generating attribute quality probabilities for B-mode ultrasound images and pairs of coordinates that indicate edges of a pleural line in the B-mode ultrasound images (processing block 901). In some embodiments, these attribute quality probabilities for B-mode ultrasound images and pairs of coordinates are generated with a first neural network implemented at least partially in hardware of a computing device.

Next, processing logic determines a region of interest in the B-mode ultrasound images (processing block 902). In some embodiments, the region of interest in the B-mode ultrasound images is determined based on the previously-generated pairs of coordinates.

Processing logic also determines a quality level of the B-mode ultrasound images as acceptable for determining the lung sliding (processing block 903). In some embodiments, the determination that the B-mode ultrasound images have a quality level that is acceptable for determining the lung sliding is determined based on the previously-generated attribute quality probabilities and an amount of motion in the region of interest. In some embodiments, the attribute quality probabilities indicate a probability of at least one attribute quality taken from the group consisting of resolution, gain, brightness, clarity, centeredness, depth, recognition of the pleural line, and recognition of a rib.

In some embodiments, determining the quality level as acceptable includes, for each of the B-mode ultrasound images, determining a horizontal span of the pleural line and comparing the horizontal span to a threshold distance. In some embodiments, determining the horizontal span of the pleural line is performed based on horizontal components of the pairs of coordinates. In some embodiments, the process includes processing logic setting the threshold distance to be a percentage of a size of at least one of the B-mode ultrasound images. For example, in some embodiments, to be considered good quality, the pleural line must be located between 20% and 60% of the image vertically and the pleural line should cross the middle of the image. In some embodiments, determining the quality level as acceptable includes, for each of the B-mode ultrasound images, determining a depth of said each of the B-mode ultrasound images based on vertical components of the pairs of coordinates.

Using the B-mode ultrasound images, processing logic generates one or more M-mode ultrasound images corresponding to one or more M-lines in the region of interest (processing block 904). In some embodiments, the M-mode ultrasound images are from columns of pixels in each of the B-mode ultrasound images that correspond to the one or more M-lines.

Based on the one or more M-mode ultrasound images, processing logic generates probabilities of the lung sliding at the one or more M-lines (processing block 905). In some embodiments, processing logic generates probabilities of the lung sliding at the one or more M-lines with a neural network. The neural network may be implemented at least partially in the hardware of the computing device (e.g., an ultrasound machine, such as the ultrasound system 130 in FIG. 1).

Processing logic can also display visual representations of the one or more M-lines that indicate the probabilities of the lung sliding at the one or more M-lines (processing block 906). Color-coded versions of the M-lines 512 drawn in FIG. 5B are examples of the visual representations of the one or more M-lines that indicate the probabilities with colors. In some embodiments, processing logic displays the representations of these M-lines in a B-mode ultrasound image. In some embodiments, processing logic displays the visual representation horizontally across the region of interest, such as via a heat bar, as previously described. In some embodiments, the process of generating the visual representation includes processing logic filtering the probabilities. The probabilities can be filtered with a smoothing function in a horizontal direction.

In some embodiments, the one or more M-mode ultrasound images include multiple M-mode ultrasound images and the one or more M-lines include multiple M-lines across the region of interest. In some embodiments, in such a case, the process generates a visual representation of the probabilities of the lung sliding at the multiple M-lines and displays the visual representation horizontally across the region of interest.

In such a case, processing logic can generate the multiple M-mode ultrasound images based on a first start frame of the B-mode ultrasound images. In some embodiments, the process includes generating additional M-mode ultrasound images based on a second start frame of the B-mode ultrasound images and generating additional probabilities of the lung sliding at the multiple M-lines. The process can also include combining the probabilities and the additional probabilities to form combined probabilities of the lung sliding at the multiple M-lines. After forming the combined probabilities, the process generates and displays a visual representation of the combined probabilities. In some embodiments, processing logic generates the additional probabilities of the lung sliding at the multiple M-lines with a neural network and based on the additional M-mode ultrasound images.

Figure 9B:
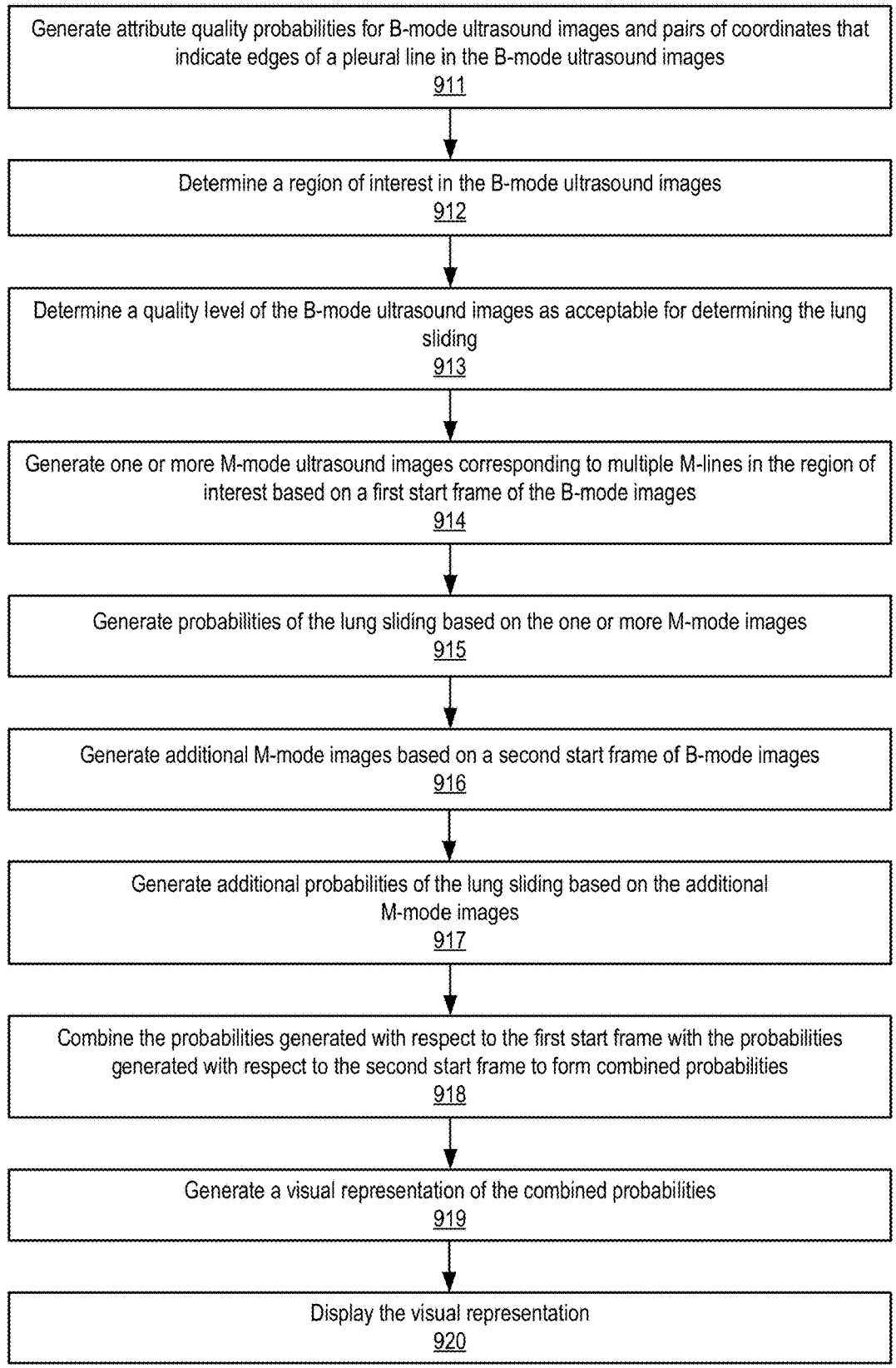
FIG. 9B illustrates some embodiments of a process for determining lung sliding in which additional probabilities of the lung sliding are generated and combined with other probabilities of lung sliding.

FIG. 9B illustrates some embodiments of a process for determining lung sliding in which the additional probabilities of the lung sliding are generated and combined with other probabilities of lung sliding. The process can be performed by processing logic that can include hardware (e.g., circuitry, dedicated logic, memory, etc.), software (such as is run on a general-purpose computer system or a dedicated machine), firmware (e.g., software programmed into a read-only memory), or combinations thereof. In some embodiments, the process is performed by one or more processors of a computing device such as, for example, but not limited to, an ultrasound machine with an ultrasound imaging subsystem.

Referring to FIG. 9B, the process begins by processing logic generating attribute quality probabilities for B-mode ultrasound images and pairs of coordinates that indicate edges of a pleural line in the B-mode ultrasound images (processing block 911). In some embodiments, these attribute quality probabilities for B-mode ultrasound images and pairs of coordinates are generated with a first neural network implemented at least partially in hardware of a computing device.

Next, processing logic determines a region of interest in the B-mode ultrasound images (processing block 912). In some embodiments, the region of interest in the B-mode ultrasound images is determined based on the previously-generated pairs of coordinates.

Processing logic also determines a quality level of the B-mode ultrasound images as acceptable for determining the lung sliding (processing block 913). In some embodiments, the determination that the B-mode ultrasound images have a quality level that is acceptable for determining the lung sliding is determined based on the previously-generated attribute quality probabilities and an amount of motion in the region of interest. In some embodiments, the attribute quality probabilities indicate a probability of at least one attribute quality taken from the group consisting of resolution, gain, brightness, clarity, centeredness, depth, recognition of the pleural line, and recognition of a rib.

In some embodiments, determining the quality level as acceptable includes, for each of the B-mode ultrasound images, determining a horizontal span of the pleural line and comparing the horizontal span to a threshold distance. In some embodiments, determining the horizontal span of the pleural line is performed based on horizontal components of the pairs of coordinates. In some embodiments, the process includes processing logic setting the threshold distance to be a percentage of a size of at least one of the B-mode ultrasound images. For example, in some embodiments, to be considered good quality, the pleural line must be located between 20% and 60% of the image vertically and the pleural line should cross the middle of the image. In some embodiments, determining the quality level as acceptable includes, for each of the B-mode ultrasound images, and determining a depth of each of these B-mode ultrasound images based on vertical components of the pairs of coordinates.

Using the B-mode ultrasound images, processing logic generates one or more M-mode ultrasound images corresponding to one or more M-lines in the region of interest (processing block 914). In some embodiments, the M-mode ultrasound images are from columns of pixels in each of the B-mode ultrasound images that correspond to the one or more M-lines.

Based on the one or more M-mode ultrasound images, processing logic generates probabilities of the lung sliding based on one or more M-mode images (e.g., at the one or more M-lines) (processing block 915). In some embodiments, processing logic generates probabilities of the lung sliding at the one or more M-lines with a neural network. The neural network may be implemented at least partially in the hardware of the computing device (e.g., an ultrasound machine, such as the ultrasound system 130 in FIG. 1).

Processing logic then generates additional M-mode ultrasound images based on a second start frame of the B-mode ultrasound images (processing block 916) and additional probabilities of the lung sliding based on the additional M-mode ultrasound images (processing block 917). In some embodiments, these are generated in the same manner as described above in conjunction with processing blocks 914 and 915.

Processing logic combines the multiple probabilities generated from processing block 915 with the additional probabilities to form combined probabilities of the lung sliding (processing block 916).

Processing logic can also generate a visual representation of the combined probabilities (processing block 919) and display the visual representation (processing block 920). Color-coded versions of the M-lines 512 drawn in FIG. 5B are examples of the visual representations of the one or more M-lines that indicate the probabilities with colors. In some embodiments, processing logic displays the representations of these M-lines in a B-mode ultrasound image. In some embodiments, processing logic displays the visual representation horizontally across the region of interest, such as via a heat bar, as previously described. In some embodiments, the process of generating the visual representation includes processing logic filtering the probabilities. The probabilities can be filtered with a smoothing function in a horizontal direction.

Figure 10:
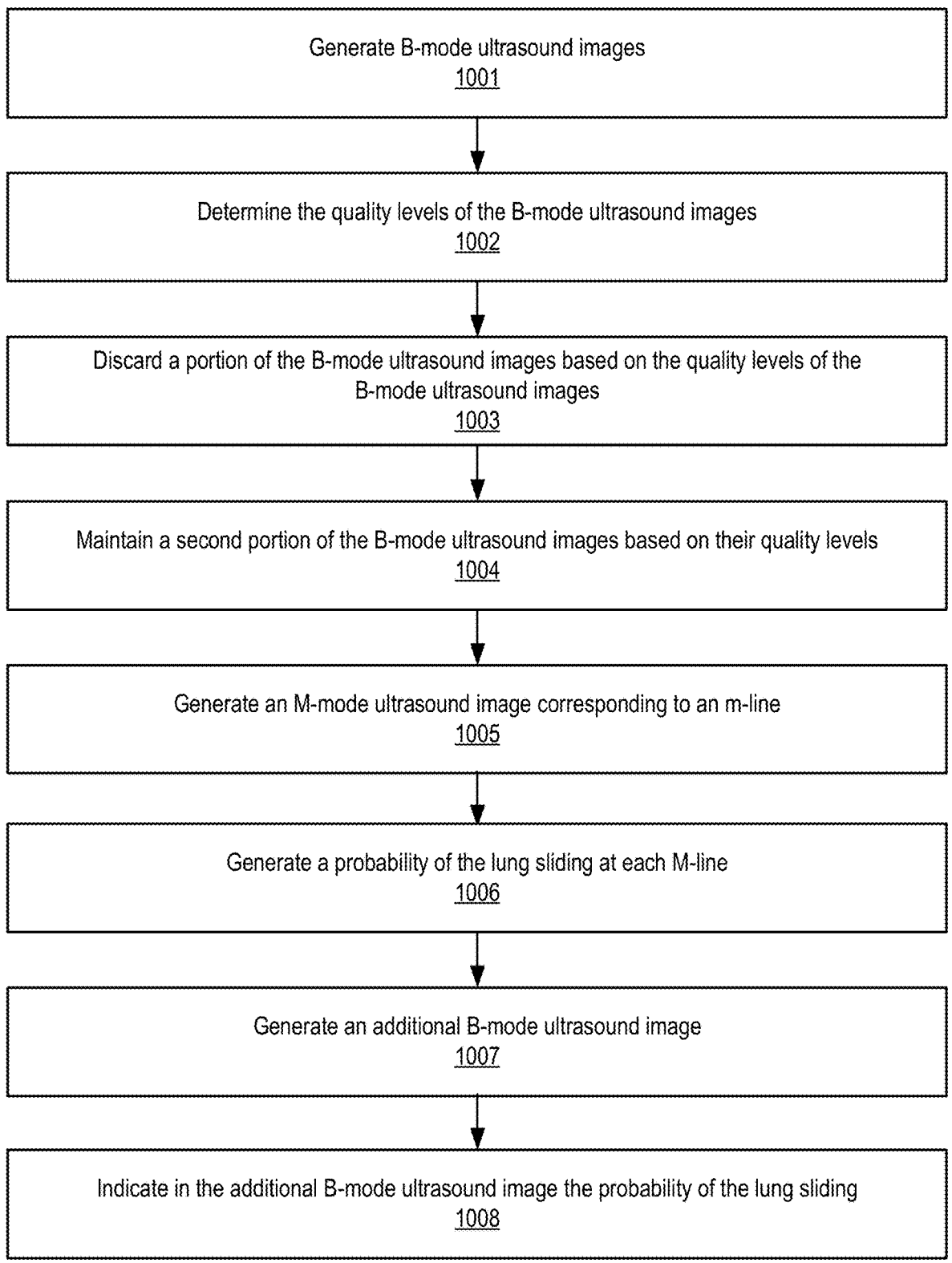
FIG. 10 illustrates a flow diagram of some embodiments of another process for determining lung sliding.

FIG. 10 illustrates a flow diagram of some embodiments of another process for determining lung sliding. The process can be performed by processing logic that can include hardware (e.g., circuitry, dedicated logic, memory, etc.), software (such as is run on a general-purpose computer system or a dedicated machine), firmware (e.g., software programmed into a read-only memory), or combinations thereof. In some embodiments, the process is performed by one or more processors of a computing device such as, for example, but not limited to, an ultrasound machine with an ultrasound imaging system.

Referring to FIG. 10, the process begins by processing logic generating B-mode ultrasound images (processing block 1001). In some embodiments, the B-mode ultrasound images are generated in a manner well-known in the art.

In some embodiments, processing logic determines the quality levels of the B-mode ultrasound images (processing block 1002). In some embodiments, processing logic determines the quality levels using a process that includes generating pairs of coordinates that indicate edges of a pleural line in the B-mode ultrasound images, determining a region of interest in the B-mode ultrasound images based on the pairs of coordinates, and determining an amount of motion in the region of interest. In some embodiments, the pairs of coordinates that indicate edges of a pleural line in the B-mode ultrasound images are generated with a neural network. The neural network may be in addition to the neural network that generates probabilities of lung sliding at an M-line. In some embodiments, the neural network that generates the pairs of coordinates is implemented at least partially in the hardware of the ultrasound system.

In some embodiments, processing logic determines the quality levels using a process that includes generating, with an additional neural network implemented at least partially in the hardware of the ultrasound system, pairs of coordinates that indicate edges of a pleural line in the B-mode ultrasound images. The process for determining the quality levels can also include determining a horizontal span of the pleural line based on the pairs of coordinates, and comparing the horizontal span to a threshold distance. In some embodiments, the processing logic generates pairs of coordinates that indicate edges of a pleural line in the B-mode ultrasound images using a neural network. The neural network can be in addition to the neural network that generates probabilities of lung sliding at an M-line. In some embodiments, the neural network that generates the pairs of coordinates is implemented at least partially in the hardware of the ultrasound system.

In some embodiments, processing logic determines the quality levels using a process that includes generating attribute quality probabilities for the B-mode ultrasound images that indicate a probability of at least one attribute quality taken from the group consisting of a resolution, a gain, a brightness, a clarity, a centeredness, a depth, a recognition of a pleural line, and a recognition of a rib. In some embodiments, processing logic generates attribute quality probabilities for the B-mode ultrasound images using a neural network. The neural network may be in addition to the neural network that generates probabilities of lung sliding at an M-line. In some embodiments, the neural network that generates the attribute quality probabilities is implemented at least partially in the hardware of the ultrasound system.

Then processing logic discards a first portion of the B-mode ultrasound images based on the quality levels of the B-mode ultrasound images (processing block 1003) while maintaining a second portion of the B-mode ultrasound images based on their quality levels (processing block 1004). In some embodiments, the probability of the lung sliding is based on the retained portion of the B-mode ultrasound images. Note also that in some embodiments, the quality may also be displayed to the user.

Using the retained B-mode ultrasound images, processing logic generates an M-mode ultrasound image corresponding to an M-line (processing block 1005). Note that this process may be repeated such that multiple M-mode ultrasound images are generated. In some embodiments, processing logic generates the M-mode images based on pixels in the B-mode ultrasound images that correspond to the M-line.

In some embodiment, processing logic also generates an additional M-mode ultrasound image based on the M-mode ultrasound image. The additional generated M-mode ultrasound image has a higher resolution than the constructed low-resolution M-mode ultrasound image, and the probability of the lung sliding is based on the additional M-mode ultrasound image. In some embodiments, generating the additional M-mode ultrasound image is performed with a neural network, such as a super-resolution neural network. The neural network (e.g., super-resolution neural network) can be in addition to the neural network that generates probabilities of lung sliding at an m-line. In some embodiments, the neural network (e.g., super-resolution neural network) is implemented at least partially in the hardware of the ultrasound system.

Based on the M-mode ultrasound image, processing logic generates a probability of the lung sliding at each M-line (processing block 1006). In some embodiments, processing logic generates a probability of the lung sliding at the M-line using a neural network. In some embodiments, the neural network is implemented at least partially in the hardware of the ultrasound system.

After generating a probability of the lung sliding at the M-line, processing logic generates an additional B-mode ultrasound image (processing block 1007) and indicates in the additional B-mode ultrasound image the probability of the lung sliding (processing block 1008).

In some embodiments, the lung sliding detection generates lung sliding probabilities based on B-mode. In some embodiments, the ultrasound system uses a neural network implemented at least partially in hardware of the ultrasound system and based on B-mode ultrasound images. In some embodiments, the neural network generates a probability of lung sliding by operating on clips of B-mode images. For example, the neural network may be fed features out of a model (e.g., a QC (QCRY) model) and features of B-mode image are generated from layers of QC model. These features can be used as conditional/additional/secondary input, with B-mode images as main input. In some embodiments, the system selects B-mode images to reduce the burden on the neural network. For example, the system can discard redundant images which would make neural network run more slowly. In some embodiments, the neural network is only fed a region of interest (ROI) of each B-mode image, instead of the full image. The ROI could be based on certain provided width and/or height. The ROI can be selected so as to capture the pleural line. If specifying the width and/or height of the ROI of interest, the location specified may indicate a distance from an end point of the pleural line to an edge of the image in both horizontal and vertical directions (left and/or right of the pleural line and above and/or below the pleural line). This results in a ROI in which the pleural line is centered. Additionally or alternatively, a height and width of the ROI can be based on the distance specified by the neural network or by the ultrasound machine.

Figure 11:
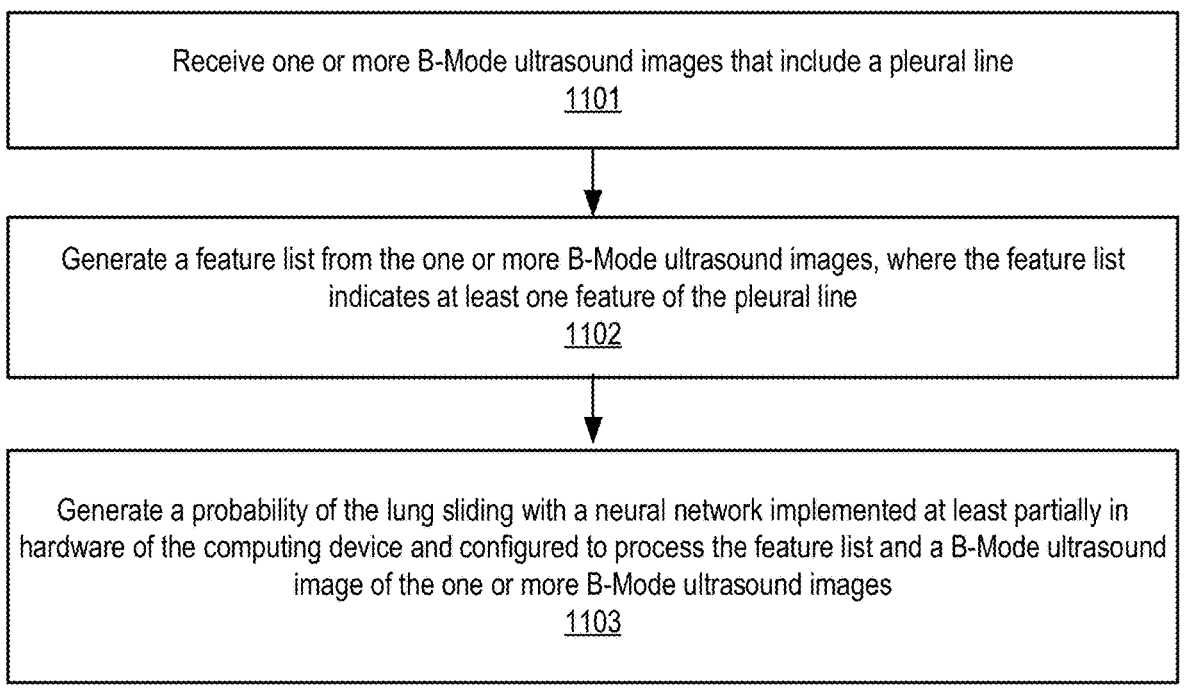
FIG. 11 illustrates a flow diagram of some other embodiments of a process for determining lung sliding

FIG. 11 illustrates a flow diagram of some other embodiments of a process for determining lung sliding. The process can be performed by processing logic that can include hardware (e.g., circuitry, dedicated logic, memory, etc.), software (such as is run on a general-purpose computer system or a dedicated machine), firmware (e.g., software programmed into a read-only memory), or combinations thereof. In some embodiments, the process is performed by one or more processors of a computing device such as, for example, but not limited to, an ultrasound machine with an ultrasound imaging system.

Referring to FIG. 11, the process begins by processing logic receiving one or more B-Mode ultrasound images that include a pleural line (processing block 1101) and generating a feature list from the one or more B-Mode ultrasound images, where the feature list indicates at least one feature of the pleural line (processing block 1102).

After generating the feature list, processing logic generates a probability of the lung sliding with a neural network implemented at least partially in hardware of the computing device and configured to process the feature list and a B-Mode ultrasound image of the one or more B-Mode ultrasound images (processing block 1103). In some embodiments, generating the probability of the lung sliding includes activating the neural network to process the feature list and the B-Mode ultrasound image automatically and without user intervention based on the B-Mode ultrasound image having a quality level above a threshold quality level.

In some embodiments, the process set forth in FIG. 11 further comprises determining a region of interest in the B-Mode ultrasound image based on a location of the pleural line in the B-Mode ultrasound image. In some of such embodiments, generating the probability of the lung sliding is based on pixels of the B-Mode ultrasound image that are included in the region of interest and not based on additional pixels of the B-Mode ultrasound image that are not included in the region of interest. In some embodiments, the location indicates a distance from an end point of the pleural line to an edge of the B-Mode ultrasound image, and the determining the region of interest is based on the distance.

In some embodiments, the process set forth in FIG. 11 further comprises generating an additional probability of the lung sliding based on an additional B-Mode ultrasound image of the one or more B-Mode ultrasound images. In some of such embodiments, generating the additional probability of the lung sliding is based on the feature list.

In some embodiments, the process set forth in FIG. 11 further comprises generating an additional probability of the lung sliding based on an additional B-Mode ultrasound image of the one or more B-Mode ultrasound images and generating an additional feature list from the additional B-Mode ultrasound image, wherein the generating the additional probability of the lung sliding is based on the additional feature list.

In some embodiments, the process set forth in FIG. 11 further comprises generating an additional probability of the lung sliding based on an additional B-Mode ultrasound image of the one or more B-Mode ultrasound images, merging the probability and the additional probability to form a merged probability of the lung sliding, and displaying, in a user interface of the computing device, a representation of the merged probability of the lung sliding.

In some embodiments, the process set forth in FIG. 11 further comprises determining an additional B-Mode ultrasound image of the one or more B-Mode ultrasound images as redundant to the B-Mode ultrasound image, and discarding the additional B-Mode ultrasound image from the one or more B-Mode ultrasound images to prevent the neural network from processing the additional B-Mode ultrasound image.

Figure 12:
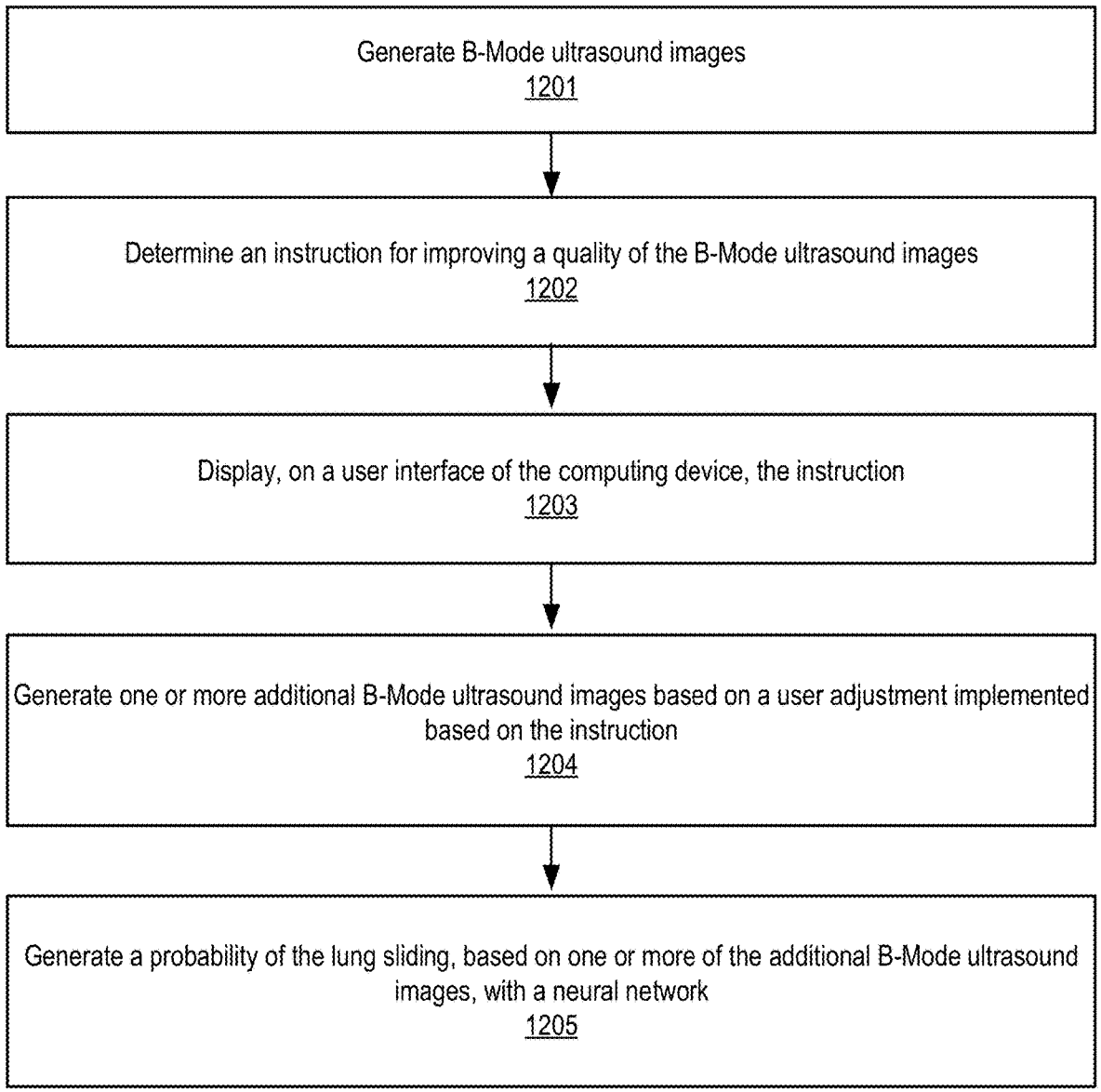
FIG. 12 illustrates a flow diagram of some other embodiments of a process for determining lung sliding.

FIG. 12 illustrates a flow diagram of some other embodiments of a process for determining lung sliding. The process can be performed by processing logic that can include hardware (e.g., circuitry, dedicated logic, memory, etc.), software (such as is run on a general-purpose computer system or a dedicated machine), firmware (e.g., software programmed into a read-only memory), or combinations thereof. In some embodiments, the process is performed by one or more processors of a computing device such as, for example, but not limited to, an ultrasound machine with an ultrasound imaging system.

Referring to FIG. 12, the process begins by processing logic generating B-Mode ultrasound images (processing block 1201). In some embodiments, the B-Mode ultrasound images include a pleural line and the quality of the B-Mode ultrasound images is based on a location of the pleural line in the B-Mode ultrasound images.

After generating the B-Mode ultrasound images, processing logic determines an instruction for improving a quality of the B-Mode ultrasound images (processing block 1202) and displays, on a user interface of the computing device, the instruction (processing block 1203). In some embodiments, the instruction includes at least one of guidance to move an ultrasound probe, an adjustment of an imaging parameter, and a recommendation for selecting the neural network from a list of neural networks available on the computing device.

Processing logic generates one or more additional B-Mode ultrasound images based on a user adjustment implemented based on the instruction (processing block 1204). In some embodiments, when generating multiple B-Mode ultrasound images, the process also includes determining redundant B-Mode ultrasound images of the multiple B-Mode ultrasound images; and excluding one or more of the redundant B-Mode ultrasound images from the generating the probability of the lung sliding by preventing the neural network from processing data determined from the one or more of the redundant B-Mode ultrasound images.

After generating one or more additional B-Mode ultrasound images based on a user adjustment implemented based on the instruction, processing logic generates a probability of the lung sliding, based on one or more of the additional B-Mode ultrasound images, with a neural network (processing block 1205). In some embodiments, the neural network is implemented at least partially in hardware of the computing device. In some embodiments, generating the probability of the lung sliding includes activating the neural network automatically and without user intervention based on the one or more of the additional B-Mode ultrasound images having a quality level above a threshold quality level.

In some embodiments, the process set forth in FIG. 12 further comprises determining a region of interest in the one or more of the additional B-Mode ultrasound images. In some of such embodiments, generating the probability of the lung sliding is based on pixels of the one or more of the additional B-Mode ultrasound images that are included in the region of interest and not based on additional pixels of the one or more of the additional B-Mode ultrasound images that are not included in the region of interest. In some of such embodiments, the determining the region of interest is based on a pleural line in the one or more of the additional B-Mode ultrasound images.

In some embodiments, a computing system (e.g., the ultrasound system) that performs the lung sliding detection described herein includes an enhanced workflow and user interface. In this case, the computing system pre-populates a worksheet with data from the neural network or AI based machine. The worksheet is then displayed, or otherwise provided, to a clinician for verification (e.g., send a "confirm based on own assessment" message). In one embodiment, the ultrasound system includes an ultrasound probe with an inertial measurement unit (IMU) and detects where in the protocol the scan is, and then performs the auto-population described above. The clinician usually follows a specific pattern according to the protocol, so with IMU data, the ultrasound system can determine that they have moved from L1 to L2. In some embodiments, the user interface can indicate the detection of a lung pulse.

Figure 13:
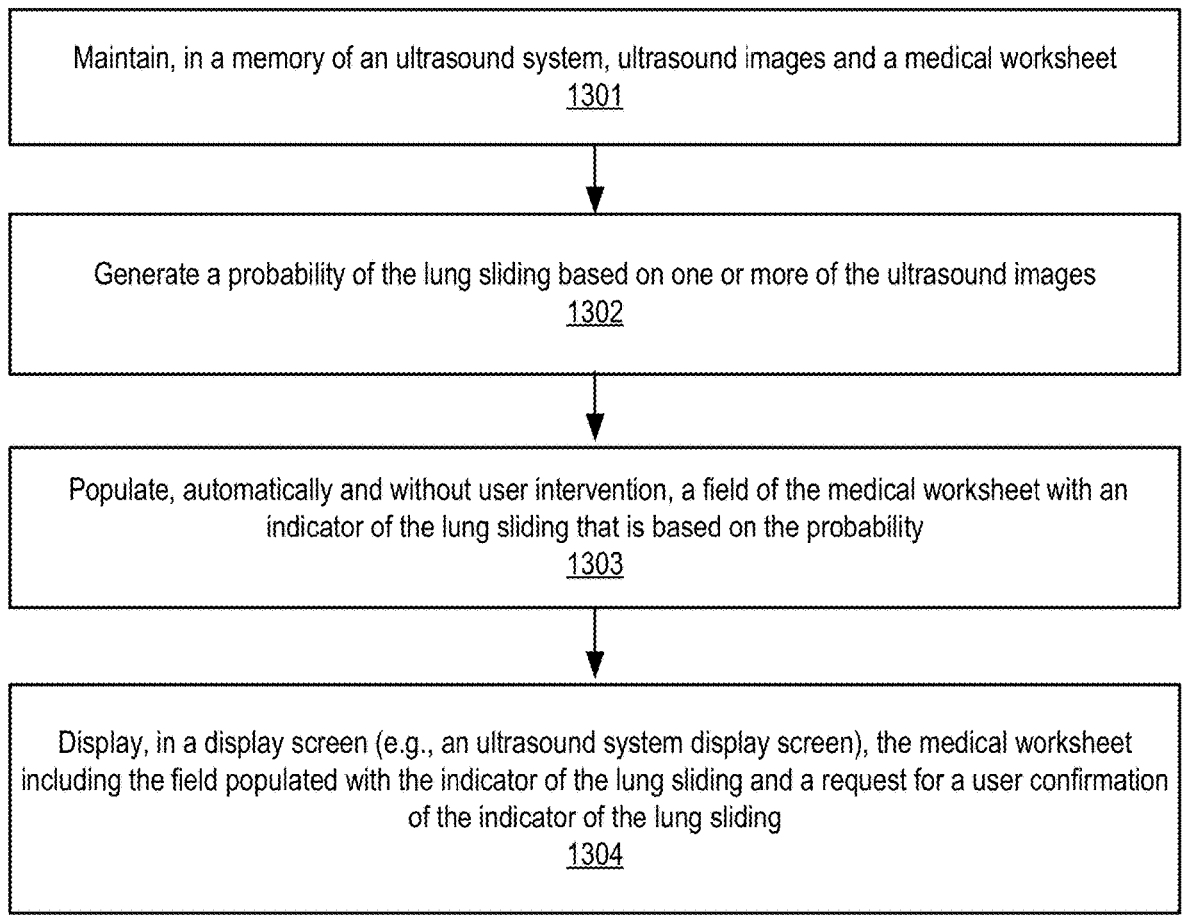
FIG. 13 illustrates a flow diagram of some other embodiments of a process for determining lung sliding.

FIG. 13 illustrates a flow diagram of some other embodiments of a process for determining lung sliding using an enhanced workflow described above. The process can be performed by processing logic that can include hardware (e.g., circuitry, dedicated logic, memory, etc.), software (such as is run on a general-purpose computer system or a dedicated machine), firmware (e.g., software programmed into a read-only memory), or combinations thereof. In some embodiments, the process is performed by one or more processors of a computing device such as, for example, but not limited to, an ultrasound machine with an ultrasound imaging system.

Referring to FIG. 13, the process begins by processing logic maintaining, in a memory of an ultrasound system, ultrasound images and a medical worksheet (processing block 1301) and generating a probability of the lung sliding based on one or more of the ultrasound images (processing block 1302). In some embodiments, the processing logic generates the probability of lung sliding using a neural network implemented at least partially in hardware of the ultrasound system.

After generating the probability of lung sliding, processing logic populates, automatically and without user intervention, a field of the medical worksheet with an indicator of the lung sliding that is based on the probability (processing block 1303). In some embodiments, the processing logic populates the field of the medical worksheet with an indicator of the lung sliding in response to the neural network generating the probability.

In some embodiments, the process set forth in FIG. 13 further comprises displaying, in a display screen (e.g., an ultrasound system display screen), the medical worksheet including the field populated with the indicator of the lung sliding and a request for a user confirmation of the indicator of the lung sliding (processing block 1304).

In some embodiments, the process set forth in FIG. 13 further comprises generating position data, wherein determining the field of the medical worksheet is based on the position data. In some of such embodiments, the position data is generated by a position sensor of an ultrasound probe of the ultrasound system.

In some embodiments, the process set forth in FIG. 13 further comprises scanning lung regions with an ultrasound probe of the ultrasound system based on position data generated by a position sensor of the ultrasound probe. These lung regions can be indicated in the medical worksheet. In some embodiments, the ultrasound system also includes an ultrasound probe having a position sensor configured to generate position data. In such a case, the processor system can be implemented to indicate in the medical worksheet, based on the position data, lung regions scanned with the ultrasound probe.

Figure 14:
FIG. 14 illustrates an example of a user interface that may be displayed to an individual (e.g., clinician) using and/or viewing a display on an ultrasound machine.

FIG. 14 illustrates an example of a user interface that may be displayed to an individual (e.g., clinician) using and/or viewing a display on an ultrasound machine.

The systems, devices, and methods disclosed herein constitute numerous advantages over conventional ultrasound systems, devices and methods that do not implement automated detection of lung slide to aid in the diagnosis of PTX. For instance, the ultrasound systems disclosed herein can reliably diagnose PTX in real-time with portable ultrasound equipment, which simply cannot be done with conventional ultrasound systems due to the time required to operate the conventional ultrasound systems and the errors introduced by the operator. Consequently, the ultrasound systems can more accurately and more quickly diagnose PTX than conventional ultrasound systems and have lifesaving impacts at the point of care.

Moreover, by using the ultrasound systems disclosed herein, the burden of resources of a care facility is reduced compared to the use of conventional ultrasound systems. This advantage is because the use of the ultrasound systems disclosed herein can result in successful diagnosis of PTX with the ultrasound system alone, without the need to send patients to another imaging department, such as a radiology department. In contrast, because conventional ultrasound systems may not suitably diagnosis PTX, as described above, they may require the use of additional imaging, and therefore place higher burdens on the resources of the care facility than the ultrasound systems disclosed herein. Hence, the ultrasound systems disclosed herein can make the care facility operate more efficiently and thus provide better patient care, compared to conventional ultrasound systems.

Further, because the ultrasound systems disclosed herein operate more quickly than conventional ultrasound systems that do not implement automated detection of lung slide to aid in the diagnosis of PTX, the operator can perform a more comprehensive ultrasound examination in a given amount of time using the ultrasound systems disclosed herein compared to conventional ultrasound systems. Accordingly, the patient may receive better care with the ultrasound systems disclosed herein compared to conventional ultrasound systems.

There are a number of example embodiments described herein.

Example 1 is method implemented by a computing device for determining lung sliding, where the method comprises: receiving one or more B-Mode ultrasound images that include a pleural line; generating a feature list from the one or more B-Mode ultrasound images, the feature list indicating at least one feature of the pleural line; and generating, with a neural network implemented at least partially in hardware of the computing device and configured to process the feature list and a B-Mode ultrasound image of the one or more B-Mode ultrasound images, a probability of the lung sliding.

Example 2 is the method of example 1 that may optionally include that the generating the probability of the lung sliding includes activating the neural network to process the feature list and the B-Mode ultrasound image automatically and without user intervention based on the B-Mode ultrasound image having a quality level above a threshold quality level.

Example 3 is the method of example 1 that may optionally include determining a region of interest in the B-Mode ultrasound image based on a location of the pleural line in the B-Mode ultrasound image, wherein the generating the probability of the lung sliding is based on pixels of the B-Mode ultrasound image that are included in the region of interest and not based on additional pixels of the B-Mode ultrasound image that are not included in the region of interest.

Example 4 is the method of example 3 that may optionally include that the location indicates a distance from an end point of the pleural line to an edge of the B-Mode ultrasound image, and the determining the region of interest is based on the distance.

Example 5 is the method of example 1 that may optionally include generating an additional probability of the lung sliding based on an additional B-Mode ultrasound image of the one or more B-Mode ultrasound images.

Example 6 is the method of example 5 that may optionally include that the generating the additional probability of the lung sliding is based on the feature list.

Example 7 is the method of example 5 that may optionally include generating an additional feature list from the additional B-Mode ultrasound image, wherein the generating the additional probability of the lung sliding is based on the additional feature list.

Example 8 is the method of example 5 that may optionally include merging the probability and the additional probability to form a merged probability of the lung sliding, and displaying, in a user interface of the computing device, a representation of the merged probability of the lung sliding.

Example 9 is the method of example 1 that may optionally include determining an additional B-Mode ultrasound image of the one or more B-Mode ultrasound images as redundant to the B-Mode ultrasound image; and discarding the additional B-Mode ultrasound image from the one or more B-Mode ultrasound images to prevent the neural network from processing the additional B-Mode ultrasound image.

Example 10 is a method implemented by a computing device for determining lung sliding, where the method comprises: generating B-Mode ultrasound images; determining an instruction for improving a quality of the B-Mode ultrasound images; displaying, on a user interface of the computing device, the instruction; generating additional B-Mode ultrasound images based on a user adjustment implemented based on the instruction; and generating, with a neural network implemented at least partially in hardware of the computing device and based on one or more of the additional B-Mode ultrasound images, a probability of the lung sliding.

Example 11 is the method of example 10 that may optionally include that the generating the probability of the lung sliding includes activating the neural network automatically and without user intervention based on the one or more of the additional B-Mode ultrasound images having a quality level above a threshold quality level.

Example 12 is the method of example 10 that may optionally include that the B-Mode ultrasound images include a pleural line and the quality of the B-Mode ultrasound images is based on a location of the pleural line in the B-Mode ultrasound images.

Example 13 is the method of example 10 that may optionally include that the one or more of the additional B-Mode ultrasound images includes multiple B-Mode ultrasound images; and wherein the method further comprises:

determining redundant B-Mode ultrasound images of the multiple B-Mode ultrasound images; and excluding one or more of the redundant B-Mode ultrasound images from the generating the probability of the lung sliding by preventing the neural network from processing data determined from the one or more of the redundant B-Mode ultrasound images.

Example 14 is the method of example 10 that may optionally include determining a region of interest in the one or more of the additional B-Mode ultrasound images, wherein the generating the probability of the lung sliding is based on pixels of the one or more of the additional B-Mode ultrasound images that are included in the region of interest and not based on additional pixels of the one or more of the additional B-Mode ultrasound images that are not included in the region of interest.

Example 15 is the method of example 14 that may optionally include that the determining the region of interest is based on a pleural line in the one or more of the additional B-Mode ultrasound images.

Example 16 is the method of example 10 that may optionally include that the instruction includes at least one of guidance to move an ultrasound probe, an adjustment of an imaging parameter, and a recommendation for selecting the neural network from a list of neural networks available on the computing device.

Example 17 is an ultrasound system for determining lung sliding, where the ultrasound system comprises: a memory to maintain ultrasound images and a medical worksheet; a neural network implemented at least partially in hardware of the ultrasound system to generate, based on one or more of the ultrasound images, a probability of the lung sliding; and a processor system to populate, automatically and without user intervention in response to the neural network generating the probability, a field of the medical worksheet with an indicator of the lung sliding that is based on the probability.

Example 18 is the ultrasound system of example 17 that may optionally include a display screen implemented to display: the medical worksheet including the field populated with the indicator of the lung sliding; and a request for a user confirmation of the indicator of the lung sliding.

Example 19 is the ultrasound system of example 17 that may optionally include an ultrasound probe having a position sensor configured to generate position data, wherein the processor system is implemented to determine the field of the medical worksheet based on the position data.

Example 20 is the ultrasound system of example 17 that may optionally include an ultrasound probe having a position sensor configured to generate position data, wherein the processor system is implemented to indicate in the medical worksheet, based on the position data, lung regions scanned with the ultrasound probe.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. A method implemented by a computing device for determining lung sliding, the method comprising:
   receiving one or more B-Mode ultrasound images that include a pleural line;
   generating a feature list from the one or more B-Mode ultrasound images, the feature list indicating at least one feature of the pleural line; and
   generating, from the one or more B-Mode ultrasound images, one or more M-Mode ultrasound images corresponding to one or more M-lines;
   generating an M-strip from the one or more M-mode images;
   determining if the M-strip has a quality level acceptable for determining lung sliding;
   upon determining the M-strip has the quality level acceptable for determining lung sliding, generating reconstructed M-Mode images from the M-strip;
   generating, with a neural network implemented at least partially in hardware of the computing device and configured to process the feature list and a B-Mode ultrasound image of the one or more B-Mode ultrasound images, a probability of the lung sliding based on the reconstructed M-Mode ultrasound images.

2. The method as described in claim 1, wherein the generating the probability of the lung sliding includes activating the neural network to process the feature list and the B-Mode ultrasound image automatically and without user intervention based on the B-Mode ultrasound image having a quality level above a threshold quality level.

3. The method as described in claim 1, further comprising determining a region of interest in the B-Mode ultrasound image based on a location of the pleural line in the B-Mode ultrasound image;
   wherein the generating the probability of the lung sliding is based on pixels of the B-Mode ultrasound image that are included in the region of interest and not based on additional pixels of the B-Mode ultrasound image that are not included in the region of interest.

4. The method as described in claim 3, wherein the location indicates a distance from an end point of the pleural line to an edge of the B-Mode ultrasound image, and the determining the region of interest is based on the distance.

5. The method as described in claim 1, further comprising generating an additional probability of the lung sliding based on an additional B-Mode ultrasound image of the one or more B-Mode ultrasound images.

6. The method as described in claim 5, wherein the generating the additional probability of the lung sliding is based on the feature list.

7. The method as described in claim 5, further comprising generating an additional feature list from the additional B-Mode ultrasound image, wherein the generating the additional probability of the lung sliding is based on the additional feature list.

8. The method as described in claim 5, further comprising:
   merging the probability and the additional probability to form a merged probability of the lung sliding; and
   displaying, in a user interface of the computing device, a representation of the merged probability of the lung sliding.

9. The method as described in claim 1, further comprising:
   determining an additional B-Mode ultrasound image of the one or more B-Mode ultrasound images as redundant to the B-Mode ultrasound image; and
   discarding the additional B-Mode ultrasound image from the one or more B-Mode ultrasound images to prevent the neural network from processing the additional B-Mode ultrasound image.

10. The method as described in claim 1, further comprising:
    generating additional B-Mode ultrasound images based on a user adjustment implemented based on an instruction; and
    wherein generating, with a neural network implemented at least partially in hardware of the computing device and configured to process the feature list and a B-Mode ultrasound image of the one or more B-Mode ultrasound images comprises generating, with the neural network implemented at least partially in hardware of the computing device and based on one or more of the additional B-Mode ultrasound images, the probability of the lung sliding.

11. The method as described in claim 1, wherein the B-Mode ultrasound images include a pleural line and quality of the B-Mode ultrasound images is based on a location of the pleural line in the B-Mode ultrasound images.

12. The method as described in claim 1, wherein the instruction includes:
1) at least one of guidance to move an ultrasound probe,
2) an adjustment of an imaging parameter, and
3) a recommendation for selecting the neural network from a list of neural networks available on the computing device.

13. An ultrasound system for determining lung sliding, the ultrasound system comprising:
a memory to store one or more B-Mode ultrasound images that include a pleural line;
a processor coupled to the memory to:
generate a feature list from the one or more B-Mode ultrasound images, the feature list indicating at least one feature of the pleural line,
generate, from the one or more B-Mode ultrasound images, one or more M-Mode ultrasound images corresponding to one or more M-lines,
generate an M-strip from the one or more M-mode images,
determine if the M-strip has a quality level acceptable for determining lung sliding, and
upon determining the M-strip has the quality level acceptable for determining lung sliding, generate reconstructed M-Mode images from the M-strip; and
a neural network implemented at least partially in hardware of the ultrasound system to process the feature list and a B-Mode ultrasound image of the one or more B-Mode ultrasound images, a probability of the lung sliding based on the reconstructed M-Mode ultrasound images.

14. The ultrasound system as described in claim 13, wherein the generating the probability of the lung sliding includes activating the neural network to process the feature list and the B-Mode ultrasound image automatically and without user intervention based on the B-Mode ultrasound image having a quality level above a threshold quality level.

15. The ultrasound system as described in claim 13, wherein the processor is configured to determine a region of interest in the B-Mode ultrasound image based on a location of the pleural line in the B-Mode ultrasound image;
wherein the neural network is configured to generate the probability of the lung sliding based on pixels of the B-Mode ultrasound image that are included in the region of interest and not based on additional pixels of the B-Mode ultrasound image that are not included in the region of interest.

16. The ultrasound system as described in claim 15, wherein the location indicates a distance from an end point of the pleural line to an edge of the B-Mode ultrasound image, and the determining the region of interest is based on the distance.

17. The ultrasound system as described in claim 13, wherein the neural network is configured to generate an additional probability of the lung sliding based on an additional B-Mode ultrasound image of the one or more B-Mode ultrasound images.

18. The ultrasound system as described in claim 17, wherein the neural network is configured to generate the additional probability of the lung sliding based on the feature list.

19. The ultrasound system as described in claim 17, wherein the processor is configured to generate an additional feature list from the additional B-Mode ultrasound image, wherein the additional probability of the lung sliding is generated based on the additional feature list.

20. The ultrasound system as described in claim 17, further comprising a computing device, and wherein the processor is configured to:
merge the probability and the additional probability to form a merged probability of the lung sliding; and
to cause display, in a user interface of the computing device, a representation of the merged probability of the lung sliding.

* * * * *